(12) United States Patent
Kim

(10) Patent No.: US 10,776,049 B2
(45) Date of Patent: Sep. 15, 2020

(54) MEMORY SYSTEM AND METHOD OF OPERATING THE SAME

(71) Applicant: SK hynix Inc., Gyeonggi-do (KR)

(72) Inventor: Se-Hyun Kim, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 53 days.

(21) Appl. No.: 16/253,090

(22) Filed: Jan. 21, 2019

(65) Prior Publication Data

US 2020/0004462 A1 Jan. 2, 2020

(30) Foreign Application Priority Data

Jun. 27, 2018 (KR) .................. 10-2018-0074106

(51) Int. Cl.
*G06F 3/06* (2006.01)

(52) U.S. Cl.
CPC .......... *G06F 3/0659* (2013.01); *G06F 3/0604* (2013.01); *G06F 3/064* (2013.01); *G06F 3/0673* (2013.01)

(58) Field of Classification Search
CPC ........ G06F 3/06; G06F 3/0659; G06F 3/0608; G06F 3/061; G06F 3/064; G06F 3/0673; G06F 3/0604; G06F 3/0614; G06F 3/0679; G06F 12/02; G06F 12/0246; G06F 11/1469; G06F 11/1048; G06F 2212/1041; G06F 2212/7201; G06F 2212/1028; G06F 2212/401; G06F 11/14; G06F 11/1441
USPC ........................................................ 711/154
See application file for complete search history.

(56) References Cited

U.S. PATENT DOCUMENTS

| 7,529,905 B2 * | 5/2009 | Sinclair ............... G06F 12/0246 711/103 |
| 8,095,765 B2 * | 1/2012 | Asnaashari ......... G06F 12/0246 711/170 |
| 8,447,920 B1 * | 5/2013 | Syu .................... G06F 12/0246 365/189.03 |
| 8,832,507 B2 | 9/2014 | Post et al. |
| 8,949,507 B2 | 2/2015 | Chou et al. |
| 2009/0157964 A1 * | 6/2009 | Kasorla ............... G06F 11/1072 711/118 |
| 2010/0131827 A1 * | 5/2010 | Sokolov ............... G06F 11/1044 714/763 |

(Continued)

FOREIGN PATENT DOCUMENTS

KR 10-2019-0110243 9/2019

*Primary Examiner* — Mano Padmanabhan
*Assistant Examiner* — Jean C Edouard
(74) *Attorney, Agent, or Firm* — IP & T Group LLP

(57) ABSTRACT a memory system may include: a memory device including a plurality of memory blocks; and a controller configured to manage the plurality of memory blocks as a plurality of super blocks, the controller may classify and may manage super blocks formed by mixing and grouping at least one bad memory block and normal memory blocks as first super blocks, and may classify and may manage super blocks formed by grouping only normal memory blocks as second super blocks, the controller may check an accumulated size of write data received from a host, may group the write data into a plurality of data groups based on a result of the checking of the accumulated size, and may store, each time one data group is formed, the formed one data group in N first super blocks and M second super blocks.

20 Claims, 15 Drawing Sheets

(56) References Cited

U.S. PATENT DOCUMENTS

| | | | |
|---|---|---|---|
| 2013/0205102 A1* | 8/2013 | Jones | G06F 12/0246 |
| | | | 711/154 |
| 2015/0134885 A1* | 5/2015 | Yeung | G11C 16/349 |
| | | | 711/103 |
| 2016/0041760 A1* | 2/2016 | Kuang | G11C 16/3495 |
| | | | 711/103 |
| 2017/0262175 A1 | 9/2017 | Kanno | |

* cited by examiner

MEMORY SYSTEM AND METHOD OF OPERATING THE SAME

CROSS-REFERENCE TO RELATED APPLICATION

This application claims priority under 35 U.S.C. § 119(a) to Korean Patent Application No. 10-2018-0074106 filed on Jun. 27, 2018, which is incorporated herein by reference in its entirety.

BACKGROUND

1. Field

Exemplary embodiments relate to a memory system, and more particularly, to a memory system including a nonvolatile memory device, and a method of operating the memory system.

2. Discussion of the Related Art

The computer environment paradigm has changed to ubiquitous computing systems that can be used anytime and anywhere. Due to this, use of portable electronic devices such as mobile phones, digital cameras, and notebook computers has rapidly increased. These portable electronic devices generally use a memory system having one or more memory devices for storing data. A memory system may be used as a main or an auxiliary storage device of a portable electronic device.

Memory systems provide excellent stability, durability, high information access speed, and low power consumption because they have no moving parts. Examples of memory systems having such advantages include universal serial bus (USB) memory devices, memory cards having various interfaces, and solid state drives (SSDs).

SUMMARY

Various embodiments are directed to a memory system capable of managing a plurality of memory blocks included in a memory device by grouping the memory blocks into super memory blocks, and a method of operating the memory system.

In an embodiment, a memory system may include: a memory device including a plurality of memory blocks each including a plurality of pages, a plurality of planes each including the plurality of memory blocks, and a plurality of dies each including the plurality of planes; and a controller configured to manage the plurality of memory blocks as a plurality of super blocks formed by grouping the plurality of memory blocks in a form corresponding to set conditions, the controller may classify and may manage super blocks formed by mixing and grouping at least one bad memory block and normal memory blocks as first super blocks of the plurality of super blocks, and may classify and may manage super blocks formed by grouping only normal memory blocks as second super blocks of the plurality of super blocks, the controller may check an accumulated size of write data received from a host, may group the write data into a plurality of data groups based on a result of the checking of the accumulated size, and may store, each time one data group is formed, the formed one data group in N first super blocks and M second super blocks, wherein N is a natural number of 1 or more, and M is the natural number greater than N.

Each time the accumulated size of write data becomes a set size based on the result of the checking of the accumulated size, the controller may group the write data having a size corresponding to the set size into one data group and stores the one data group in the N first super blocks and the M second super blocks, and the set size may be predetermined based on a state of the memory device, and values of N and M may be predetermined based on the predetermined set size.

The controller may manage: a first use count indicating the number of first super blocks used in storing the one data group among the N first super blocks; and a second use count indicating the number of second super blocks used in storing the one data group among the M second super blocks.

When the second use count is different from M, the controller may select any one of the M second super blocks, may increase a value of the second use count, and then may store the write data in the selected second super block.

When the second use count is equal to M, the controller may select any one of the N first super blocks, may increase a value of the first use count, and then may store the write data in the selected first super block, and when the increased value of the first use count is equal to N, the controller may initialize the respective values of the first and second use counts.

The controller may classify and may manage first super blocks each including bad blocks the number of which is a set value or less among the first super blocks as third super blocks, the controller classify and may manage first super blocks each including bad blocks the number of which exceeds the set value among the first super blocks as fourth super blocks, when the write data are a first type of data, the controller may store the formed one data group in K third super blocks and I second super blocks, when the write data are a second type of data, the controller may store the formed one data group in L fourth super blocks and J second super blocks, and K may be a natural number of 1 or more, K may be the natural number less than I, L is the natural number less than J, L is the natural number greater than K, and N may be a number obtained by adding K to L.

When the write data are the first type of data, each time the accumulated size of write data may become a first set size based on the result of the checking of the accumulated size, the controller may group the write data having a size corresponding to the first set size into one data group and may store the one data group in the K third super blocks and the I second super block, when the write data are the second type of data, each time the accumulated size of write data may become a second set size based on the result of the checking of the accumulated size, the controller may group the write data having a size corresponding to the second set size into one data group and may store the one data group in the L fourth super blocks and the J second super block, and the first and second set sizes may be predetermined based on a state of the memory device, and values of N, K, L, M, I, and J may be predetermined based on the predetermined set sizes.

The controller may manage: a second use count indicating the number of second super blocks used in storing the one data group among the I or J second super blocks; a third use count indicating the number of third super blocks used in storing the one data group among the K third super blocks; and a fourth use count indicating the number of fourth super blocks used in storing the one data group among the L fourth super blocks.

When the write data are the first type of data and the second use count is different from I, the controller may select any one of the I second super blocks, may increase a value of the second use count, and then may store the write data in the selected second super block, and when the write data are the second type of data and the second use count is different from J, the controller may select any one of the J second super blocks, may increase the value of the second use count, and then may store the write data in the selected second super block.

When the write data are the first type of data and the second use count is equal to I, the controller may select any one of the K third super blocks, may increase a value of the third use count, and then may store the write data in the selected third super block, and, when the increased value of the third use count is equal to K, the controller may initialize the respective values of the second and third use counts, and when the write data are the second type of data and the second use count is equal to J, the controller may select any one of the L fourth super blocks, may increase a value of the fourth use count, and then may store the write data in the selected fourth super block, and, when the increased value of the fourth use count is equal to L, the controller may initialize the respective values of the second and fourth use counts.

In an embodiment, a method of operating a memory system comprising a memory device, the memory device including a plurality of memory blocks each including a plurality of pages, a plurality of planes each including the plurality of memory blocks, and a plurality of dies each including the plurality of planes, the method may include: managing the plurality of memory blocks as a plurality of super blocks formed by grouping the plurality of memory blocks in a form corresponding to set conditions; performing a first operation of classifying and managing, as first super blocks of the plurality of super blocks, super blocks formed by mixing and grouping at least one bad memory block and normal memory blocks; performing a second operation of classifying and managing, as second super blocks of the plurality of super blocks, super blocks formed by grouping only normal memory blocks; performing a third operation of checking an accumulated size of write data received from a host, and grouping the write data into a plurality of data groups based on a result of the checking of the accumulated size; and performing a storage operation for storing, each time one data group is formed in the third operation, the formed one data group in N first super blocks among the first super blocks formed in the first operation and M second super blocks among the second super blocks formed in the second operation, N may be a natural number of 1 or more, and M is the natural number greater than N.

The third operation may include: grouping, each time the accumulated size of write data becomes a set size based on the result of the checking of the accumulated size, the write data having a size corresponding to the set size into one data group, the set size may be predetermined based on a state of the memory device, and values of N and M may be predetermined based on the predetermined set size.

The method may further include managing a first use count indicating the number of first super blocks used in storing the one data group among the N first super blocks, and a second use count indicating the number of second super blocks used in storing the one data group among the M second super blocks, the first and second use counts being used in the storage operation.

Performing the storage operation may include selecting, when the second use count is different from M, any one of the M second super blocks, increasing a value of the second use count, and then storing the write data in the selected second super block.

Performing the storage operation may include selecting, when the second use count is equal to M, any one of the N first super blocks, increasing a value of the first use count, and then storing the write data in the selected first super block, and initializing, when the increased value of the first use count is equal to N, the respective values of the first and second use counts.

The method may further include: performing a fourth operation of classifying and managing, as third super blocks, first super blocks each including bad blocks the number of which is a set value or less among the first super blocks classified in the first operation; and performing a fifth operation of classifying and managing, as fourth super blocks, first super blocks each including bad blocks the number of which exceeds the set value among the first super blocks classified in the first operation, performing the storage operation may include: performing a first storage operation of storing, when the write data are a first type of data, one data group formed in the third operation in K third super blocks among the third super blocks classified in the fourth operation and in I second super blocks among the second super blocks classified in the second operation; and performing a second storage operation of storing, when the write data are a second type of data, one data group formed in the fourth operation in L fourth super blocks among the fourth super blocks classified in the fifth operation and in J second super blocks among the second super blocks classified in the second operation, and K may be a natural number of 1 or more, K may be the natural number less than I, L may be the natural number less than J, L may be the natural number greater than K, and N may be a number obtained by adding K to L.

Performing the third operation may include: grouping, when the write data are the first type of data and each time the accumulated size of write data becomes a first set size based on the result of the checking of the accumulated size, the write data having a size corresponding to the first set size into one data group; and grouping, when the write data are the second type of data and each time the accumulated size of write data becomes a second set size based on the result of the checking of the accumulated size, the write data having a size corresponding to the second set size into one data group, the first and second set sizes may be predetermined based on a state of the memory device, and values of N, K, L, M, I, and J may be predetermined based on the predetermined set sizes.

The method may further include managing a second use count indicating the number of second super blocks used in storing the write data among the I or J second super blocks, a third use count indicating the number of third super blocks used in storing the write data among the K third super blocks, and a fourth use count indicating the number of fourth super blocks used in storing the write data among the L fourth super blocks.

Performing the first storage operation may include selecting, when the second use count is different from I, any one of the I second super blocks, increasing a value of the second use count, and then storing the write data in the selected second super block, and performing the second storage operation may include selecting, when the second use count is different from J, any one of the J second super blocks, increasing the value of the second use count, and then storing the write data in the selected second super block.

Performing the first storage operation may include selecting, when the second use count is equal to M, any one of the K third super blocks, increasing a value of the third use count, and then storing the write data in the selected third super block, and, initializing, when the increased value of the third use count is equal to K, the respective values of the second and third use counts, and performing the second storage operation may include selecting, when the second use count is equal to M, any one of the L fourth super blocks, increasing a value of the fourth use count, and then storing the write data in the selected fourth super block, and, initializing, when the increased value of the fourth use count is equal to L, the respective values of the second and fourth use counts.

In an embodiment, a memory system may include: a memory device including a plurality of memory blocks; and a controller suitable for: managing the plurality of memory blocks as a plurality of super blocks including normal super blocks and insufficient super blocks, each of the insufficient super blocks including at least one bad memory block and normal memory blocks; and controlling the number of normal super blocks and the number of insufficient super blocks to be used for storing write data based on an amount of the write data.

BRIEF DESCRIPTION OF THE DRAWINGS

These and other features and advantages of the present invention will become apparent to those skilled in the art to which the present invention pertains from the following detailed description in reference to the accompanying drawings, wherein.

DETAILED DESCRIPTION

Figure 1:
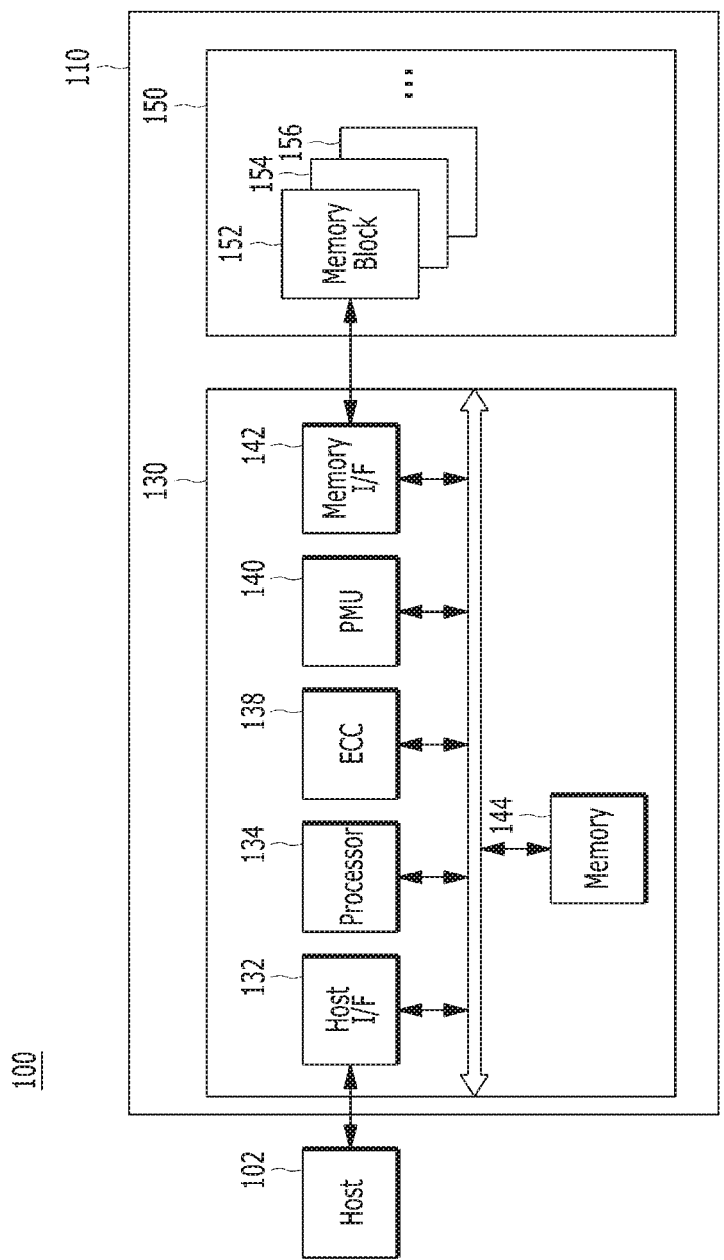
FIG. 1 is a block diagram illustrating a data processing system including a memory system in accordance with an embodiment of the present invention.

Various embodiments of the present invention are described below in more detail with reference to the accompanying drawings. We note, however, that the present invention may be embodied in different forms including variations of any of the disclosed embodiments. Thus, the present invention is not limited to the embodiments set forth herein. Rather, the described embodiments are provided so that this disclosure is thorough and complete and fully conveys the present invention to those skilled in the art to which this invention pertains. Throughout the disclosure, like reference numerals refer to like parts throughout the various figures and embodiments of the present invention. Also, throughout the specification, reference to "an embodiment," "another embodiment," or the like is not necessarily to only one embodiment, and different references to any such phrase are not necessarily to the same embodiment(s).

It will be understood that, although the terms "first", "second", "third", and so on may be used herein to identify various elements, these elements are not limited by these terms. These terms are used to distinguish one element from another element that otherwise have the same or similar names. Thus, a first element in one instance could be termed a second or third element in another instance without departing from the spirit and scope of the present invention.

The drawings are not necessarily to scale and, in some instances, proportions may have been exaggerated in order to clearly illustrate features of the embodiments.

It will be further understood that when an element is referred to as being "connected to", "coupled to," or in "communication with" another element, such connection, coupling or communication may be wired or wireless, and also may be direct or indirect, i.e., through one or more intervening elements, unless stated, or the context requires otherwise. In addition, it will also be understood that when an element is referred to as being "between" two elements, it may be the only element between the two elements, or one or more intervening elements may also be present.

The terminology used herein is for the purpose of describing particular embodiments and is not intended to be limiting of the present invention. As used herein, singular forms are intended to include the plural forms and vice versa, unless the context clearly indicates otherwise. It will be further understood that the terms "comprises," "comprising," "includes," and "including" when used in this specification, specify the presence of the stated elements but do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

FIG. 1 is a block diagram illustrating a data processing system 100 including a memory system 110 in accordance with an embodiment of the present invention.

Referring to FIG. 1, the data processing system 100 may include a host 102 and the memory system 110.

The host 102 may be implemented as any of a variety of portable electronic devices such as a mobile phone, MP3 player and laptop computer or as any of a variety of non-portable electronic devices such as a desktop computer, game machine, television (TV) and projector.

The memory system 110 may operate to store data for the host 102 in response to a request of the host 102. Non-limiting examples of the memory system 110 include a solid state drive (SSD), a multi-media card (MMC), a secure digital (SD) card, a universal storage bus (USB) device, a universal flash storage (UFS) device, compact flash (CF) card, a smart media card (SMC), a personal computer memory card international association (PCMCIA) card and memory stick. The MMC may include an embedded MMC (eMMC), reduced size MMC (RS-MMC) and micro-MMC. The SD card may include a mini-SD card and micro-SD card.

The memory system 110 may be embodied by any of various types of storage devices. Non-limiting examples of storage devices in the memory system 110 include volatile memory devices such as a dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM) and a flash memory. The flash memory may have a 3-dimensional (3D) stack structure.

The memory system 110 may include a controller 130 and a memory device 150. The memory device 150 may store data for the host 120, and the controller 130 may control data storage into the memory device 150.

The controller 130 and the memory device 150 may be integrated into a single semiconductor device, which may be implemented as any of the various types of memory systems exemplified above.

Non-limiting application examples of the memory system 110 include a computer, an ultra mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game machine, a navigation system, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a radio frequency identification (RFID) device, or one of various components constituting a computing system.

The memory device 150 may be a nonvolatile memory device that retains data stored therein even though power is not supplied. The memory device 150 may store data provided from the host 102 through a write operation, and provide data stored therein to the host 102 through a read operation. The memory device 150 may include a plurality of memory dies (not shown), each memory die including a plurality of planes (not shown), each plane including a plurality of memory blocks 152 to 156, each of which may include a plurality of pages. Each of the pages may include a plurality of memory cells coupled to a word line.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, write, program and erase operations of the memory device 150.

The controller 130 may include a host interface (I/F) 132, a processor 134, an error correction code (ECC) component 138, a power management unit (PMU) 140, a memory interface (I/F) (or a NAND flash controller (NFC)) 142 and a memory 144, all operatively coupled via an internal bus.

The host interface 132 may be configured to process a command and data of the host 102, and may communicate with the host 102 through one or more of various interface protocols such as universal serial bus (USB), multi-media card (MMC), peripheral component interconnect-express (PCI-e or PCIe), small computer system interface (SCSI), serial-attached SCSI (SAS), serial advanced technology attachment (SATA), parallel advanced technology attachment (DATA), enhanced small disk interface (ESDI) and integrated drive electronics (IDE).

The ECC component 138 may detect and correct an error contained in the data read from the memory device 150. In other words, the ECC component 138 may perform an error correction decoding process to the data read from the memory device 150 through an ECC code used during an ECC encoding process. According to a result of the error correction decoding process, the ECC component 138 may output a signal, for example, an error correction success/fail signal. When the number of error bits is more than a threshold value of correctable error bits, the ECC component 138 may not correct the error bits, and instead may output an error correction fail signal.

The ECC component 138 may perform error correction through a coded modulation such as low density parity check (LDPC) code, Bose-Chaudhri-Hocquenghem (BCH) code, turbo code, Reed-Solomon (RS) code, convolution code, recursive systematic code (RSC), trellis-coded modulation (TCM) and block coded modulation (BCM). However, the ECC component 138 is not limited to these correction techniques. As such, the ECC component 138 may include all circuits, modules, systems or devices for suitable error correction.

The PMU 140 may provide and manage power of the controller 130.

The NFC 142 may serve as a memory or storage interface for interfacing the controller 130 and the memory device 150 such that the controller 130 controls the memory device 150 in response to a request from the host 102. When the memory device 150 is a flash memory or specifically a NAND flash memory, the NFC 142 may generate a control signal for the memory device 150 and process data to be provided to the memory device 150 under the control of the processor 134. The NFC 142 may work as an interface (e.g., a NAND flash interface) for processing a command and data between the controller 130 and the memory device 150. Specifically, the NFC 142 may support data transfer between the controller 130 and the memory device 150.

The memory 144 may serve as a working memory of the memory system 110 and the controller 130, and store data for driving the memory system 110 and the controller 130. The controller 130 may control the memory device 150 to perform read, write, program and erase operations in response to a request from the host 102. The controller 130 may provide data read from the memory device 150 to the host 102, may store data provided from the host 102 into the memory device 150. The memory 144 may store data required for the controller 130 and the memory device 150 to perform these operations.

The memory 144 may be embodied by a volatile memory. For example, the memory 144 may be embodied by a static random access memory (SRAM) or dynamic random access memory (DRAM). The memory 144 may be disposed within or externally to the controller 130. FIG. 1 shows the memory 144 disposed within the controller 130. However, in another embodiment, the memory 144 may be embodied by an external volatile memory having a memory interface transferring data between the memory 144 and the controller 130.

The processor 134 may control the overall operations of the memory system 110. The processor 134 may drive firmware to control the overall operations of the memory system 110. The firmware may be referred to as flash translation layer (FTL).

The processor 134 of the controller 130 may include a management unit (not illustrated) for performing a bad management operation of the memory device 150. The management unit may perform a bad block management operation of identifying a block in which a program fail occurs due to the characteristic of a NAND flash memory during a program operation (i.e., a bad block), among the plurality of memory blocks 152 to 156 in the memory device 150. The management unit may write the program-failed data of the bad block to a new memory block. In the memory device 150 having a 3D stack structure, the bad block management operation may reduce the use efficiency of the memory device 150 and the reliability of the memory system 110. Thus, the bad block management operation needs to be performed with more reliability.

Figure 2:
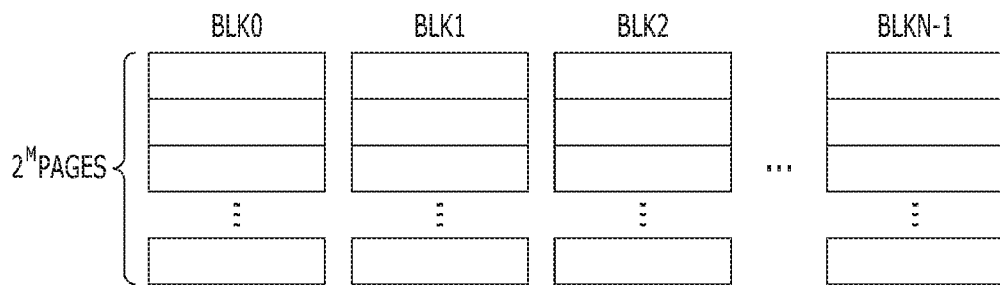
FIG. 2 is a diagram illustrating a memory device employed in the memory system shown in FIG. 1.

FIG. 2 is a diagram illustrating the memory device 150 of the memory system 110 in FIG. 1.

Referring to FIG. 2, the memory device 150 may include a plurality of memory blocks 0 to N−1, and each of the blocks 0 to N−1 may include a plurality of pages, for example, $2^M$ pages, the number of which may vary according to circuit design. Memory cells in the respective memory blocks 0 to N−1 may be one or more of a single level cell (SLC) storing 1 bit of data, or a multi-level cell (MLC) storing 2 or more bits of data. In an embodiment, the memory device 150 may include a plurality of triple level cells (TLC) each storing 3 bit of data. In another embodiment, the memory device 150 may include a plurality of quadruple level cells (QLC) each storing 4 bit of data.

Figure 3:
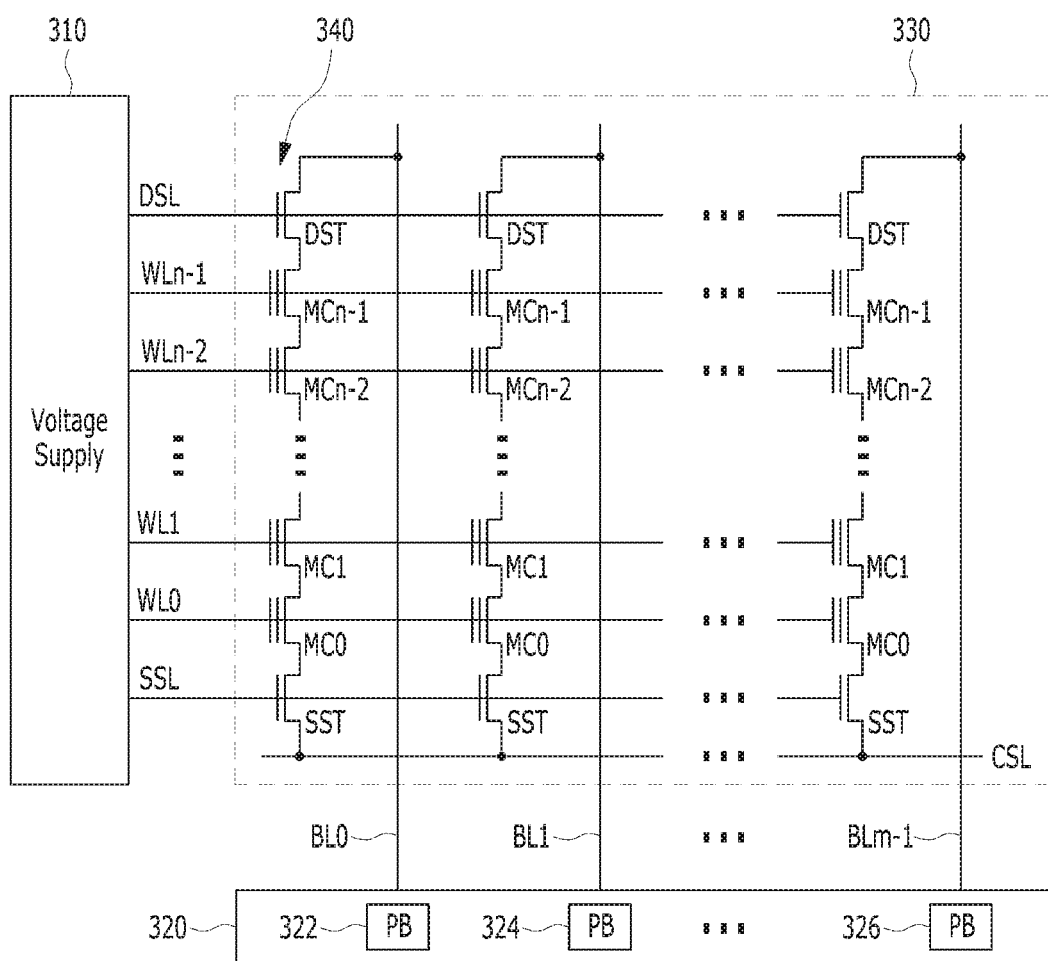
FIG. 3 is a circuit diagram illustrating a memory cell array of a memory block in the memory device shown in FIG. 2.

FIG. 3 is a circuit diagram illustrating a memory cell array of a memory block 330 in the memory device 150.

Referring to FIG. 3, the memory block 330, which may correspond to any of the plurality of memory blocks 152 to 156 in the memory device 150 of the memory system 110, may include a plurality of cell strings 340 coupled to a plurality of corresponding bit lines BL0 to BLm−1. In the cell strings 340, each column may include one or more drain select transistors DST and one or more source select transistors SST. Between the drain and source select transistors DST and SST, a plurality of memory cells MC0 to MCn−1 may be coupled in series. In an embodiment, each of the memory cell transistors MC0 to MCn−1 may be embodied by an MLC capable of storing data information of a plurality of bits. Each of the cell strings 340 may be electrically coupled to a corresponding bit line among the plurality of bit lines BL0 to BLm−1. For example, as illustrated in FIG. 3, the first cell string is coupled to the first bit line BL0, and the last cell string is coupled to the last bit line BLm−1.

Although FIG. 3 illustrates NAND flash memory cells, the invention is not limited to this configuration. The memory cells may be NOR flash memory cells, or hybrid flash memory cells including two or more kinds of memory cells combined therein. Also, it is noted that the memory device 150 may be a flash memory device including a conductive floating gate as a charge storage layer or a charge trap flash (CTF) memory device including an insulation layer as a charge storage layer.

The memory device 150 may further include a voltage supply 310 which provides word line voltages including a program voltage, a read voltage and a pass voltage to supply the word lines according to an operation mode. The voltage generation operation of the voltage supply 310 may be controlled by a control circuit (not illustrated). Under the control of the control circuit, the voltage supply 310 may select one of the memory blocks (or sectors) of the memory cell array, select one of the word lines of the selected memory block, and provide the word line voltages to the selected word line and the unselected word lines as may be needed.

The memory device 150 may include a read and write (read/write) circuit 320 which is controlled by the control circuit. During a verification/normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive, from a buffer (not illustrated), data to be stored into the memory cell array, and drive bit lines according to the received data. The read/write circuit 320 may include a plurality of page buffers (PBs) 322 to 326 respectively corresponding to columns (or bit lines) or column pairs (or bit line pairs). Each of the page buffers 322 to 326 may include a plurality of latches (not illustrated).

Figure 4:
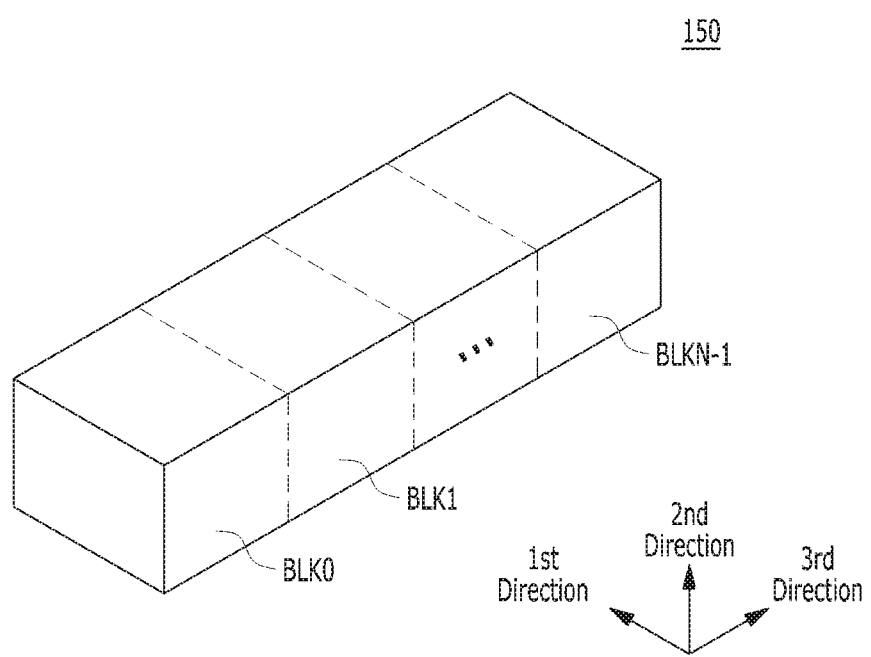
FIG. 4 is a diagram illustrating a three-dimensional structure of the memory device shown in FIG. 2.

FIG. 4 is a diagram illustrating a three-dimensional (3D) structure of the memory device 150 in FIG. 2.

The memory device 150 may be embodied by a two-dimensional (2D) or 3D memory device. Specifically, as illustrated in FIG. 4, the memory device 150 may be embodied by a nonvolatile memory device having a 3D stack structure. When the memory device 150 has a 3D structure, the memory device 150 may include a plurality of memory blocks BLK0 to BLKN−1 each having a 3D structure (or vertical structure).

Figure 5:
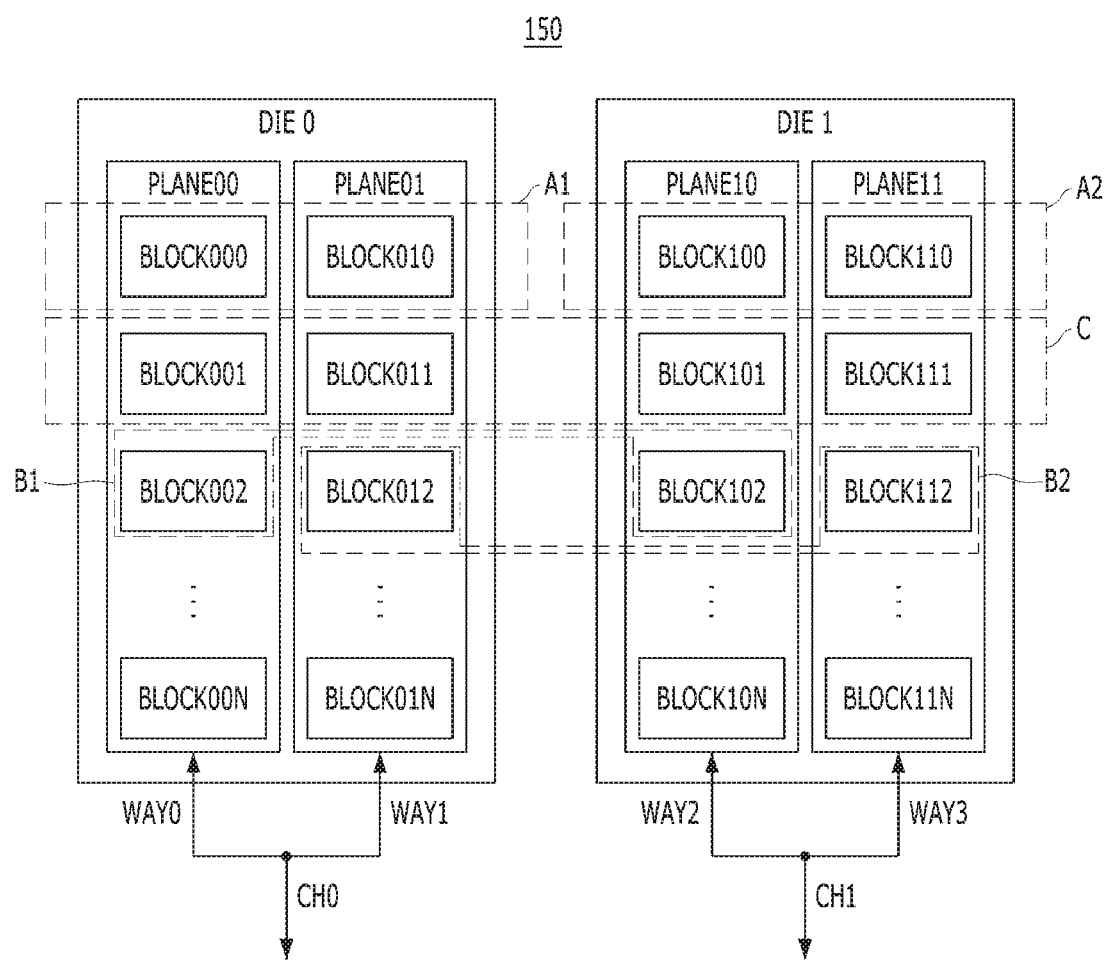
FIG. 5 is a diagram illustrating a super memory block used in a memory system in accordance with an embodiment of the present invention.

FIG. 5 is a diagram illustrating a super memory block used in a memory system in accordance with an embodiment of the present invention.

Referring to FIG. 5, the memory device 150 may include an arrangement of dies, planes and memory blocks.

The memory device 150 includes a plurality of memory blocks BLOCK000, BLOCK001, BLOCK002, . . . and BLOCK00N, BLOCK010, BLOCK011, BLOCK012, . . . and BLOCK00N, BLOCK100, BLOCK101, BLOCK102, . . . and BLOCK00N, and BLOCK110, BLOCK111, BLOCK112, . . . and BLOCK11N.

The memory device 150 includes a zeroth memory die DIE0 capable of inputting/outputting data through a zeroth channel CH0 and a first memory die DIE1 capable of inputting/outputting data through a first channel CH1. The zeroth channel CH0 and the first channel CH1 may input/output data in an interleaving scheme.

The zeroth memory die DIE0 includes a plurality of planes PLANE00 and PLANE01 respectively corresponding to a plurality of ways WAY0 and WAY1 capable of inputting/outputting data in the interleaving scheme by sharing the zeroth channel CH0.

The first memory die DIE1 includes a plurality of planes PLANE10 and PLANE11 respectively corresponding to a plurality of ways WAY2 and WAY3 capable of inputting/outputting data in the interleaving scheme by sharing the first channel CH1.

The first plane PLANE00 of the zeroth memory die DIE0 includes a set or predetermined number of memory blocks, i.e., BLOCK000, BLOCK001, BLOCK002, . . . and BLOCK00N, among all of the plurality of memory blocks BLOCK000, BLOCK001, BLOCK002, . . . and BLOCK00N, BLOCK010, BLOCK011, BLOCK012, . . . and BLOCK01N, BLOCK100, BLOCK101, BLOCK102, . . . and BLOCK00N, and BLOCK110, BLOCK111, BLOCK112, . . . and BLOCK11N.

The second plane PLANE01 of the zeroth memory die DIE0 includes the set or predetermined number of memory blocks, i.e., BLOCK010, BLOCK011, BLOCK012, . . . and BLOCK01N, among all of the plurality of memory blocks.

The first plane PLANE10 of the first memory die DIE1 includes the set or predetermined number of memory blocks, i.e., BLOCK100, BLOCK101, BLOCK102, . . . and BLOCK10N, among all of the plurality of memory blocks.

The second plane PLANE11 of the first memory die DIE1 includes the set or predetermined number of memory blocks, i.e., BLOCK110, BLOCK111, BLOCK112, . . . and BLOCK11N, among all of the plurality of memory blocks.

In this manner, the plurality of memory blocks in the memory device 150 may be divided according to physical positions such that blocks in the same plane use the same way and blocks in the same die use the same channel.

While it is illustrated in FIG. 5 that the memory device 150 includes two dies, each of which include two planes, this is merely an example. The number of memory dies in the memory device 150 may be any suitable number based on design and operational considerations, and the number of planes in each memory die may likewise be different than in the example shown in FIG. 5. Of course, the set or predetermined number of memory blocks in each plane also may be different depending on design and operational considerations.

Also, different from dividing the memory blocks according to physical positions, the controller 130 may use a scheme of dividing the memory blocks according to simultaneous selection and operation of memory blocks. That is, the controller 130 may manage a plurality of memory blocks by grouping memory blocks capable of being selected simultaneously and thereby dividing the plurality of memory blocks into super memory blocks.

The plurality of memory blocks grouped into super memory blocks by the controller 130 may be divided according to various schemes depending on design considerations. For example, three schemes will be described herein.

In a first scheme, the controller 130 may create and manage one super memory block A1 in the memory device 150 by grouping one memory block BLOCK000 in the first plane PLANE00 of the zeroth memory die DIE0 and one memory block BLOCK010 in the second plane PLANE01 of the zeroth memory die DIE0. When applying the first scheme to the first memory die DIE1, the controller 130 may create and manage one super memory block A2 by grouping one memory block BLOCK100 in the first plane PLANE10 and one memory block BLOCK110 in the second plane PLANE11.

In a second scheme, the controller 130 may create and manage one super memory block 61 to include memory block BLOCK002 in the first plane PLANE00 of the zeroth memory die DIE0 and one memory block BLOCK102 in the first plane PLANE10 of the first memory die DIE1. When applying the second scheme again, the controller 130 may create and manage one super memory block 62 by grouping one memory block BLOCK012 in the second plane PLANE01 of the zeroth memory die DIE0 and one memory block BLOCK112 in the second plane PLANE11 of the first memory die DIE1. Thus, while the first scheme groups two memory blocks from two different planes in the same die into a super block, the second scheme groups one block from each of the different dies into a super block. The methodology of either scheme may be extended to apply to arrangements of more than two dies and more than two planes in a die.

In a third scheme, the controller 130 may create and manage one super memory block C by grouping one memory block BLOCK001 in the first plane PLANE00 of the zeroth memory die DIE0, one memory block BLOCK011 in the second plane PLANE01 of the zeroth memory die DIE0, one memory block BLOCK101 in the first plane PLANE10 of the first memory die DIE1, and one memory block BLOCK111 included in the second plane PLANE11 of the first memory die DIE1. Thus, in the third scheme, two blocks, from each plane in each die, are grouped to form a super block. The third scheme may also be extended to apply to more complex die/plane arrangements, as is further described below.

Memory blocks capable of being selected simultaneously by being included in the same super memory block may be selected substantially simultaneously through an interleaving scheme, for example, a channel interleaving scheme, a memory die interleaving scheme, a memory chip interleaving scheme or a way interleaving scheme.

Figure 6A:
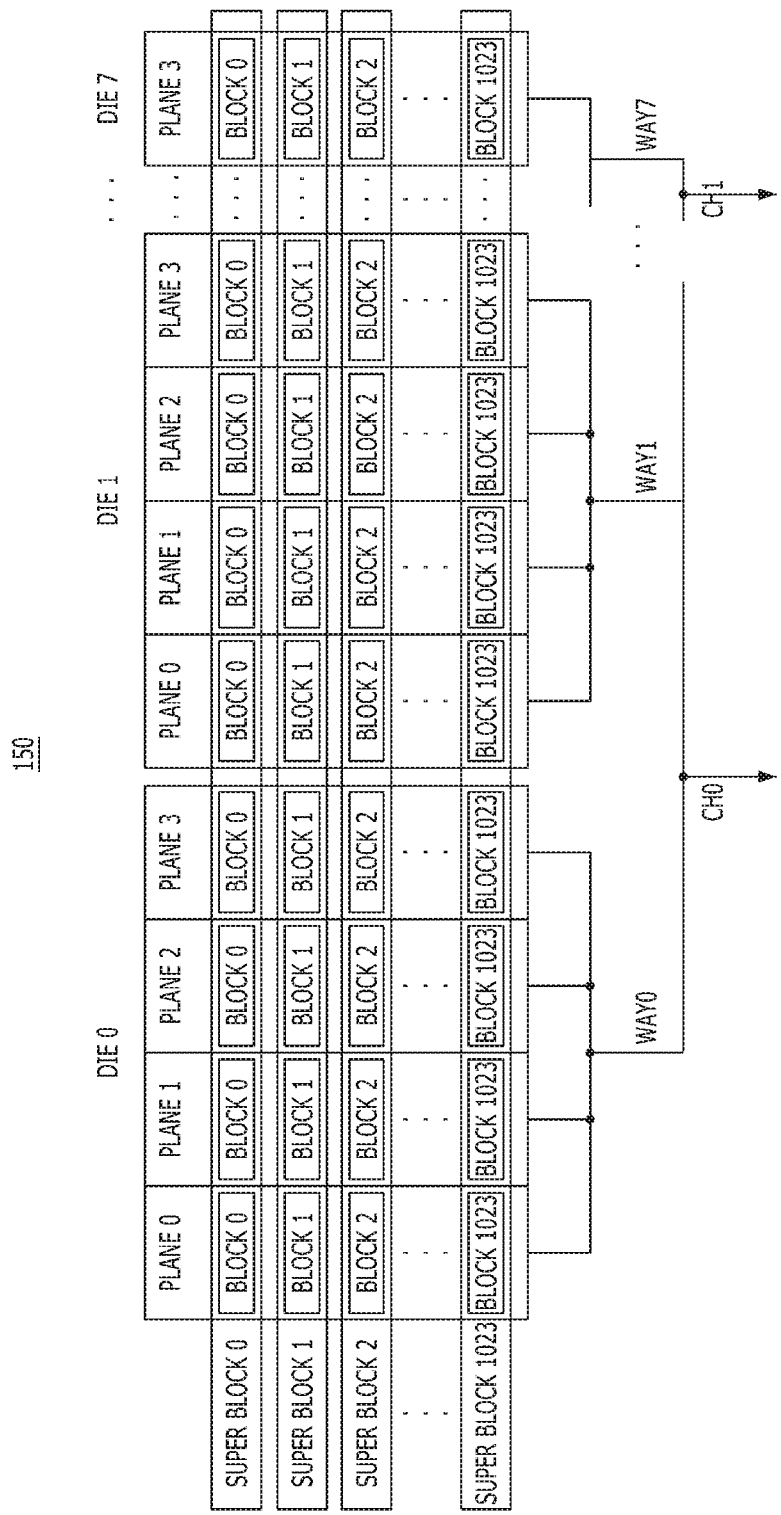
FIGS. 6A and 6B are diagrams illustrating an operation of managing memory blocks by the unit of super memory block in a memory system in accordance with an embodiment of the present invention.
Figure 6B:

FIGS. 6A and 6B are diagrams illustrating an operation of managing memory blocks by the unit of super memory block in the memory system in accordance with an embodiment of the present invention.

Referring to FIG. 6A, the controller 130 may manage the plurality of memory blocks in the memory device 150 using a scheme of forming super memory blocks by dividing the plurality of memory blocks into the super memory blocks.

In FIG. 6A, the memory device 150 includes eight memory dies DIE<0:7>. Each of the eight memory dies DIE<0:7> includes four planes PLANE<0:3> to allow the eight memory dies DIE<0:7> to include total 32 planes (i.e., PLANE<0:3>*8). Each of the 32 planes PLANE<0:3>*8 includes 1024 memory blocks BLOCK<0:1023>. In other words, the memory device 150 includes a total of 32768 memory blocks BLOCK<0:1023>*32.

In the memory device 150 illustrated in FIG. 6A, the total 32 planes PLANE<0:3>*8 in the eight memory dies DIE<0:7> may input and/or output data through two channels CH<0:1> and eight ways WAY<0:7>. Namely, four ways WAY<0:3> or WAY<4:7> share one channel CH0 or CH1. Four planes PLANE<0:3> share one way among WAY0, WAY1, WAY2, WAY3, WAY4, WAY5, WAY6 and WAY7.

The controller 130 of the memory system 110 uses a scheme of managing the plurality of memory blocks in the memory device 150 in the unit of a super memory block. In particular, it may be seen that the embodiment shown in FIG. 6A uses the third scheme of dividing memory blocks into super memory blocks by the controller 130 as described above with reference to FIG. 5.

That is, in FIG. 6A, the controller 130 forms each of the super memory blocks SUPER BLOCK<0:1023> by selecting one memory block in each of 32 planes PLANE<0:3>*8 in the memory device 150, and manages the super blocks. Therefore, 32 memory blocks are included in each of the super memory blocks SUPER BLOCK<0:1023>.

Since the controller 130 selects simultaneously 32 memory blocks in each of the super memory blocks SUPER BLOCK<0:1023>, in a configuration in which management is performed by the unit of super memory block as in FIG. 6A, super memory block addresses (not shown) for selecting the respective super memory blocks SUPER BLOCK<0:1023> may be used.

In this manner, in order to use the super memory block addresses, the controller 130 uses a scheme of managing super memory blocks by grouping memory blocks of the same relative positions in the respective 32 planes PLANE<0:3>*8 in the memory device 150.

For example, the controller 130 forms and manages a zeroth super memory block SUPER BLOCK0 by grouping 32 zeroth memory blocks BLOCK0 in the respective 32 planes PLANE<0:3>*8. The controller 130 forms and manages a first super memory block SUPER BLOCK1 by grouping 32 first memory blocks BLOCK1 in the respective 32 planes PLANE<0:3>*8. The controller 130 forms and manages a second super memory block SUPER BLOCK2 by grouping 32 second memory blocks BLOCK2 in the respective 32 planes PLANE<0:3>*8. In this manner, the controller 130 manages the 32768 memory blocks BLOCK<0:1023>*32 in the memory device 150 by managing 1024 super memory blocks SUPER BLOCK<0:1023>, each including 32 memory blocks.

The fact that the controller 130 manages the memory blocks BLOCK<0:1023>*32 by managing the super blocks SUPER BLOCK<0:1023>, means that the controller 130 sets an access processing unit to super memory block unit. Even though the controller 130 selects each of the super memory blocks SUPER BLOCK<0:1023> by using its super memory block address, e each memory block address is used in the controller 130. For example, the fact that the controller 130 accesses the zeroth super memory block SUPER BLOCK0 through a zeroth super memory block address means that 32 memory blocks corresponding to 32 zeroth memory blocks BLOCK0 of the respective 32 planes PLANE<0:4>*8 which are grouped into the zeroth super memory block SUPER BLOCK0 are accessed at once.

It is nearly impossible for all the memory blocks in the memory device 150 to operate normally. Namely, when mounting and using the memory device 150, there may be at least one bad memory block which does not operate among the plurality of memory blocks. Such a memory block, which has poor durability, may be determined as a bad memory block because it does not perform a normal operation even when its lifetime limit is not reached.

As described above, in the case where, the controller 130 uses the scheme of managing super memory blocks by grouping memory blocks of the same relative positions or locations in the respective 32 planes PLANE<0:3>*8, it is not possible to set an access processing unit to a super memory block unit for a super memory block, among the super memory blocks SUPER BLOCK<0:1023>, in which a bad memory block is included.

For example, even though only one memory block is a bad memory block and all the remaining 31 memory blocks are good, if the access processing unit of the corresponding super memory block cannot be set to a super memory block unit, it is markedly inefficient to manage such a super block.

In consideration of this fact, a super memory block where at least one memory block included therein is a bad memory block is reused by employing a regenerated super block table 700 as shown in FIG. 6B.

Referring to FIG. 66, one or more memory blocks among the 32 memory blocks in each of the 718th super memory block SUPER BLOCK718, the 820th super memory block SUPER BLOCK820 and the 829th super memory block SUPER BLOCK829, among all of super memory blocks SUPER in the memory device 150, are determined as bad memory blocks.

In detail, among the 32 memory blocks included in the 718th super memory block SUPER BLOCK718, the memory block in the first plane PLANE1 of the first memory die DIE1 is determined as a bad memory block and the remaining 31 memory blocks are good memory blocks.

Among the 32 memory blocks included in the 820th super memory block SUPER BLOCK820, the memory block in the first plane PLANE1 of the third memory die DIE5 and the memory block in the first plane PLANE1 of the fourth memory die DIE4 are determined as bad memory blocks and the remaining 30 memory blocks are good memory blocks.

Among the 32 memory blocks included in the 829th super memory block SUPER BLOCK829, the memory block in the first plane PLANE1 of the zeroth memory die DIE0 is determined as a bad memory block and the remaining 31 memory blocks are good memory blocks.

In this state, the controller 130 generates the regenerated super block table 700 for replacing the bad memory blocks in the respective 718th super memory block SUPER BLOCK718, 820th super memory block SUPER BLOCK820 and 829th super memory block SUPER BLOCK829, determined as bad super memory blocks, with good memory blocks, thereby regenerating normally operating super memory blocks.

In detail, in order to reuse the 718th super memory block SUPER BLOCK718, the controller 130 should search for a memory block capable of replacing the bad memory block in the first plane PLANE1 of the first memory die DIE1.

To this end, the controller 130 searches for a super memory block in which at least one bad memory block is included, among the super memory blocks SUPER BLOCK<0:1023>. The controller 130 may exclude, as the search target, any super memory block having only good memory blocks.

The controller 130 may search the 820th super memory block SUPER BLOCK820 which includes two bad memory blocks. In doing so, the controller 130 checks whether the position or location of either of the bad memory blocks in the 820th super memory block SUPER BLOCK820 is the same as that of the bad memory block in the 718th super memory block SUPER BLOCK718.

If the location of either of the bad memory blocks in the 820th super memory block SUPER BLOCK820 is the same as that of the bad memory block in the 718th super memory block SUPER BLOCK718, the 820th super memory block SUPER BLOCK820 is excluded as a search target, and another super memory block is searched. Conversely, if the location of either of the bad memory blocks in the 820th super memory block SUPER BLOCK820 is different from that of the bad memory block in the 718th super memory block SUPER BLOCK718, the 820th super memory block SUPER BLOCK820 is determined as a search target super memory block.

As can be seen from FIG. 6B, the bad memory block of the 718th super memory block SUPER BLOCK718 is located in the first plane PLANE1 of the first memory die DIE1, and the bad memory blocks of the 820th super memory block SUPER BLOCK820 are located in the first plane PLANE1 of the third memory die DIE3 and the first plane PLANE1 of the fourth memory die DIE4. In other words, the locations of the bad memory blocks in the 820th super memory block SUPER BLOCK820 do not overlap with the location of the bad memory block in the 718th super memory block SUPER BLOCK718.

Therefore, the controller 130 determines the 820th super memory block SUPER BLOCK820 as a search target, and generates the regenerated super block table 700 such that the memory block in the first plane PLANE1 of the first memory die DIE1, among the 32 memory blocks in the 820th super memory block SUPER BLOCK820, may be used for the 718th super memory block SUPER BLOCK718.

Namely, in order to replace the 718th super memory block SUPER BLOCK718, the controller 130 sets the first row of the regenerated super block table 700 as a zeroth regenerated super memory block RE SUPER BLOCK0, and stores the block address values of 32 memory blocks for replacing the 718th super memory block SUPER BLOCK718.

Thus, in the values of the zeroth regenerated super memory block RE SUPER BLOCK0 stored in the first row of the regenerated super block table 700, only one block address for indicating the memory block in the first plane PLANE1 of the first memory die DIE1 is the block address of the 820th super memory block SUPER BLOCK820, and all the remaining 31 block addresses are the block addresses of the 718th super memory block SUPER BLOCK718.

In this way, because the regenerated super block table 700 is generated, when the controller 130 accesses the 718th super memory block SUPER BLOCK718, reference may be made to the values of the zeroth regenerated super memory block RE SUPER BLOCK0 stored in the first row of the regenerated super block table 700.

Then, in order to reuse the 820th super memory block SUPER BLOCK820, the controller 130 should search for memory blocks capable of replacing the memory block in the first plane PLANE1 of the first memory die DIE1, the bad memory block in the first plane PLANE1 of the third memory die DIE3 and the bad memory block in the first plane PLANE1 of the fourth memory die DIE4 among the 32 memory blocks included in the 820th super memory block SUPER BLOCK820.

Even though there are only two bad memory blocks among the memory blocks in the 820th super memory block SUPER BLOCK820, a search may be conducted for memory blocks capable of replacing three memory blocks among the 32 memory blocks included in the 820th super memory block SUPER BLOCK820. The reason why the search may be conducted for memory blocks capable of replacing three memory blocks among the 32 memory blocks included in the 820th super memory block SUPER BLOCK820 is that one memory block of the 820th super memory block SUPER BLOCK820 is used to normally operate the 718th super memory block SUPER BLOCK718 as a regenerated super memory block. Namely, the reason is that the regenerated super block table 700 is generated to use the memory block in the first plane PLANE1 of the first memory die DIE1 among the 32 memory blocks included in the 820th super memory block SUPER BLOCK820.

Hence, in order to reuse the 820th super memory block SUPER BLOCK820, the controller 130 searches for a super memory block in which at least one bad memory block is included, among the super memory blocks SUPER BLOCK<0:1023>. The controller 130 may exclude, as a search target, any super memory block, among the super memory blocks SUPER BLOCK<0:1023>, in which only good memory blocks are included.

The controller 130 may search the 829th super memory block SUPER BLOCK829 which includes one bad memory block. In doing so, the controller 130 checks whether the location of the bad memory block in the 829th super memory block SUPER BLOCK829 is the same as the location of the bad memory block in the 718th super memory block SUPER BLOCK718 and the locations of the bad memory blocks included in the 820th super memory block SUPER BLOCK820.

If blocks in the same location exists, i.e., if the location of the bad memory block in the 829th super memory block SUPER BLOCK829 is the same as the location of the bad memory block in the 718th super memory block SUPER BLOCK718 and the locations of the bad memory blocks included in the 820th super memory block SUPER BLOCK820, the 829th super memory block SUPER BLOCK829 is excluded as a search target, and another super memory block is searched. Conversely, if there is no location overlap, the 829th super memory block SUPER BLOCK829 is determined as a search target super memory block.

As can be seen from FIG. 6B, the bad memory block of the 829th super memory block SUPER BLOCK829 is located in the first plane PLANE1 of the zeroth memory die DIE0, the bad memory block of the 718th super memory block SUPER BLOCK718 is located in the first plane PLANE1 of the first memory die DIE1, and the bad memory blocks of the 820th super memory block SUPER BLOCK820 are located in the first plane PLANE1 of the third memory die DIE3 and the first plane PLANE1 of the fourth memory die DIE4. That is, the location of the bad memory block of the 829th super memory block SUPER BLOCK829 does not overlap with the locations of the bad memory blocks in the 820th super memory block SUPER BLOCK820 and the location of the bad memory block included in the 718th super memory block SUPER BLOCK718.

Therefore, the controller 130 determines the 829th super memory block SUPER BLOCK829 as a search target, and generates the regenerated super block table 700 such that the memory block in the first plane PLANE1 of the first memory die DIE1, the memory block in the first plane PLANE1 of the third memory DIE3 and the memory block in the first plane PLANE1 of the fourth memory die DIE4 of the 829th super memory block SUPER BLOCK829 may be used for the 820th super memory block SUPER BLOCK820.

Namely, in order to replace the 820th super memory block SUPER BLOCK820, the controller 130 sets the second row of the regenerated super block table 700 as a first regenerated super memory block RE SUPER BLOCK1, and stores the respective block address values of 32 memory blocks for replacing the 820th super memory block SUPER BLOCK820.

Thus, among the values of the first regenerated super memory block RE SUPER BLOCK1 stored in the second row of the regenerated super block table 700, only three are block addresses for blocks in the super memory block SUPER BLOCK829: one indicating the memory block in the first plane PLANE1 of the first memory die DIE1, another indicating the memory block in the first plane PLANE1 of the third memory die DIE3 and the third indicating the memory block in the first plane PLANE1 of the fourth memory die DIE4. All the remaining 29 block addresses are for memory blocks of the 820th super memory block SUPER BLOCK820.

In this way, because the regenerated super block table 700 is generated, when the controller 130 accesses the 820th super memory block SUPER BLOCK820, reference may be made to the values of the first regenerated super memory block RE SUPER BLOCK1 stored in the second row of the regenerated super block table 700.

Then, in order to reuse the 829th super memory block SUPER BLOCK829, the controller 130 should search for memory blocks capable of replacing the bad memory block in the first plane PLANE1 of the zeroth memory die DIE0, the memory block in the first plane PLANE1 of the first memory die DIE1, the memory block in the first plane PLANE1 of the third memory die DIE3 and the memory block in the first plane PLANE1 of the fourth memory die DIE4, among the 32 memory blocks included in the 829th super memory block SUPER BLOCK829.

Even though only one bad memory block is in the 829th super memory block SUPER BLOCK829, memory blocks capable of replacing four memory blocks among the 32 memory blocks in the 829th super memory block SUPER BLOCK829 are searched. The reason why the memory blocks capable of replacing four memory blocks among the 32 memory blocks in the 829th super memory block SUPER BLOCK829 are searched is that three good memory blocks of the 829th super memory block SUPER BLOCK829 are used to normally operate the 820th super memory block SUPER BLOCK820 as a regenerated super memory block. Namely, the reason is that the regenerated super block table 700 is generated to use the memory blocks in the first plane PLANE1 of the first memory die DIE1, the first plane PLANE1 of the third memory die DIE3 and the first plane PLANE1 of the fourth memory die DIE4, among the 32 memory blocks included in the 829th super memory block SUPER BLOCK829.

Hence, in order to reuse the 829th super memory block SUPER BLOCK829, the controller 130 searches for a super memory block in which at least one bad memory block is included, among the super memory blocks SUPER BLOCK<0:1023>. The controller 130 may exclude, as a search target, any super memory block among the super memory blocks SUPER BLOCK<0:1023>, in which only good memory blocks are included.

As a result of the search, the controller 130 may not search a super memory block which includes a bad memory block. Accordingly, the controller 130 does not reuse the 829th super memory block SUPER BLOCK829.

By using the regenerated super block table 700 as described above with reference to FIG. 66, even though bad memory blocks are included in the three super memory blocks SUPER BLOCK718, SUPER BLOCK820 and SUPER BLOCK829, it is possible to set an access processing unit to super memory block unit for the two super memory blocks SUPER BLOCK718 and SUPER BLOCK820.

That is, in the scheme as shown in FIG. 6B, some super memory blocks, i.e., SUPER BLOCK718 and SUPER BLOCK820, among the super memory blocks SUPER BLOCK718, SUPER BLOCK820 and SUPER BLOCK829 including bad memory blocks, are normally used, and only the super memory block SUPER BLOCK829 is not used.

However, even in the scheme as shown in FIG. 6B, the super memory block SUPER BLOCK829, although incapable of being used, still exists, and the good memory blocks in the super memory block SUPER BLOCK829 cannot be used because they are not grouped by a super memory block unit.

Therefore, the memory system 110, in accordance with an embodiment, may operate in such a way as to allow a super memory block, which includes a bad memory block as will be described below with reference to FIGS. 7 to 10, to utilize all good memory blocks. That is, a situation in which a good memory block that is incapable of being used does not exist.

FIGS. 7 to 10 are diagrams illustrating an operation of managing a super memory block including a bad memory block in a memory system in accordance with an embodiment.

Figure 7:
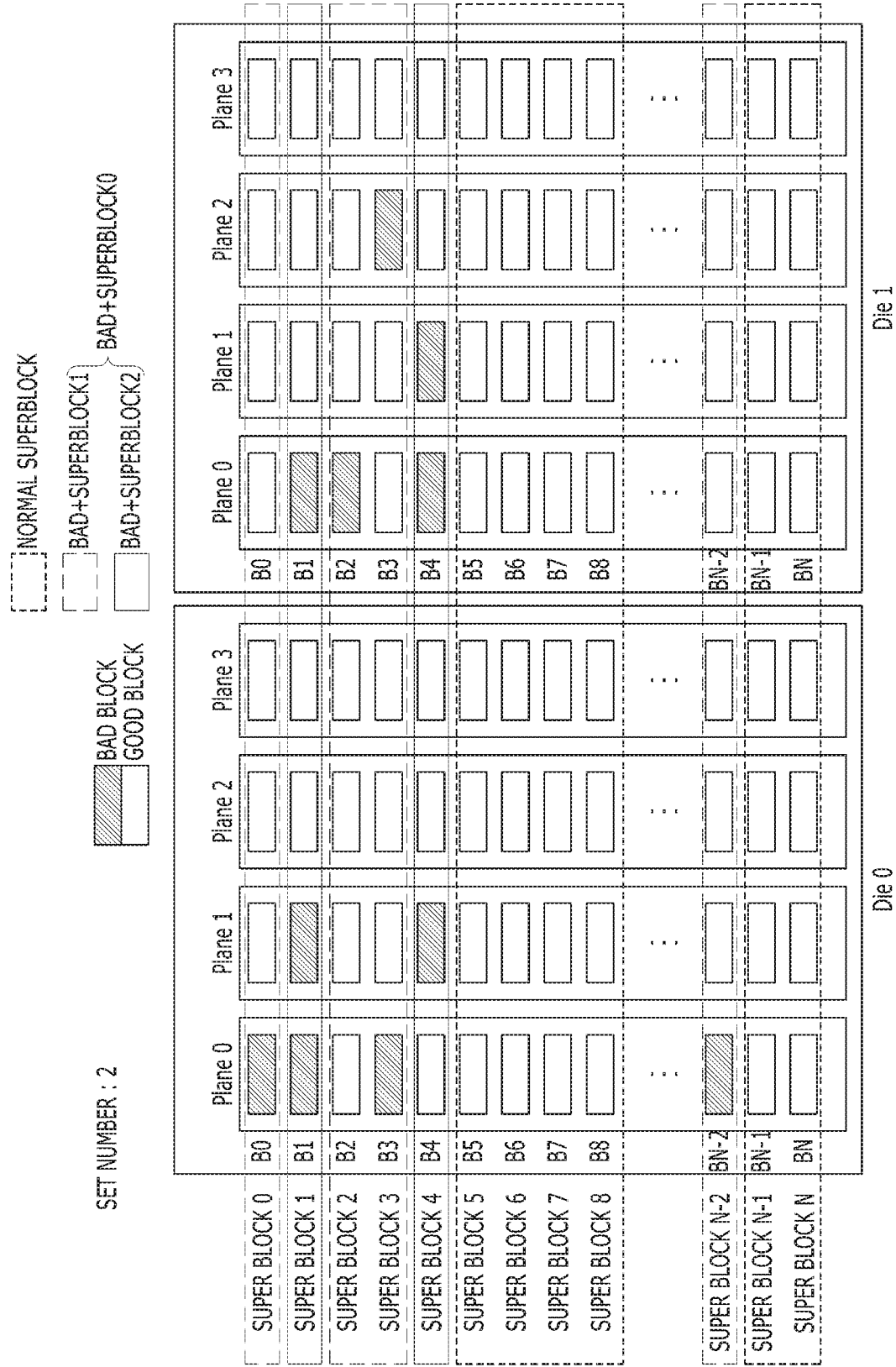
FIGS. 7 to 10 are diagrams illustrating an operation of managing a super memory block including a bad memory block in a memory system in accordance with an embodiment.

Referring to FIG. 7, the controller 130 may manage super memory blocks such that bad memory blocks and good memory blocks are mixed in any super memory block.

The memory device 150 includes two memory dies DIE<0:1>. Each of the two memory dies DIE<0:1> includes four planes PLANE<0:3> to allow the two memory dies DIE<0:1> to include total eight planes PLANE<0:3>*2. Each of the eight planes PLANE<0:3>*2 includes (N+1) memory blocks B<0:N>. This configuration is an example only.

The controller 130 of the memory system 110 uses a scheme of managing the plurality of memory blocks by the unit of super memory block. In particular, FIG. 7 illustrates the third scheme of dividing memory blocks into super memory blocks by the controller 130 as described above with reference to FIG. 5.

In FIG. 7, the controller 130 manages each of super memory blocks SUPER BLOCK<0:N> by selecting one memory block in each of the eight planes PLANE<0:3>*2 in the memory device 150. Therefore, eight memory blocks are included in each of the super memory blocks SUPER BLOCK<0:N>.

In the embodiment shown in FIG. 7, some super blocks include at least one bad block with the remainder being good blocks. That is, a super memory block may include one or more bad memory blocks.

In a zeroth super memory block SUPER BLOCK<0>, one memory block corresponding to a zeroth plane PLANE<0> of a zeroth die DIE<0> is a bad memory block, and that one bad memory block is grouped with seven good memory blocks.

In a first super memory block SUPER BLOCK<1>, three memory blocks corresponding to the zeroth plane PLANE<0> of the zeroth die DIE<0>, a first plane PLANE<1> of the zeroth die DIE<0> and a zeroth plane PLANE<0> of a first die DIE<1> are bad memory blocks, and they are grouped with five good memory blocks.

In a second super memory block SUPER BLOCK<2>, one memory block corresponding to the zeroth plane PLANE<0> of the first die DIE<1> is a bad memory block, and it is grouped with seven good memory blocks.

In a third super memory block SUPER BLOCK<3>, two memory blocks corresponding to the zeroth plane PLANE<0> of the zeroth die DIE<0> and a second plane PLANE<2> of the first die DIE<1> are bad memory blocks, and they are grouped with six good memory blocks.

In a fourth super memory block SUPER BLOCK<4>, three memory blocks corresponding to the first plane PLANE<1> of the zeroth die DIE<0>, the zeroth plane PLANE<0> of the first die DIE<1> and the first plane PLANE<1> of the first die DIE<1> are bad memory blocks, and they are grouped with five good memory blocks.

In an (N−2)th super memory block SUPER BLOCK<N−2>, one memory block corresponding to the zeroth plane PLANE<0> of the zeroth die DIE<0> is a bad memory block, and it is grouped with seven good memory blocks.

Each of the remaining super memory blocks SUPER BLOCK<5:N-3, N-1, N> includes no bad memory block, and thus they are managed as normal super memory blocks, each with eight good memory blocks only.

As described above, in FIG. 7, when the super memory blocks SUPER BLOCK<0:4, N-2> including at least one bad memory block and good memory blocks are grouped, it is impossible to set an access processing unit to a super memory block unit as described above with reference to FIGS. 6A and 6B.

In the zeroth super memory block SUPER BLOCK<0>, the second super memory block SUPER BLOCK<2> and the (N-2)th super memory block SUPER BLOCK<N-2>, only seven good memory blocks are included in each of them. In the third super memory block SUPER BLOCK<3>, only six good memory blocks are included. In the first super memory block SUPER BLOCK<1> and the fourth super memory block SUPER BLOCK<4>, only five good memory blocks are included in each of them.

Thus, each of the normal super memory blocks SUPER BLOCK<5:N-3, N-1, N>, in which no bad memory block is included, satisfy the condition of the access processing unit being the super memory block unit because the eight memory blocks are accessed at once. Conversely, in the case of the super memory blocks SUPER BLOCK<0:4, N-2>, each including at least one bad memory block, these blocks do not satisfy the condition of the access processing unit being the super memory block unit.

In consideration of this, the controller 130 manages the super memory blocks SUPER BLOCK<0:4, N-2> by classifying them as first super blocks indicated as BAD+SUPERBLOCK0. Conversely, the normal super memory blocks SUPER BLOCK<5:N-3, N-1, N> are managed by being classified as second super blocks indicated as NORMAL SUPERBLOCK.

Also, the controller 130 differently manages the respective uses of the first super blocks BAD+SUPERBLOCK0 based on the numbers of the bad memory blocks included in the respective first super blocks BAD+SUPERBLOCK0. That is, the controller 130 manages first super blocks SUPER BLOCK<0, 2, 3, N-2>, each of which includes a number of bad memory blocks which is less than or equal to a preset number (e.g., 2), among the first super blocks BAD+SUPERBLOCK0, by classifying them as third super blocks BAD+SUPERBLOCK1. The controller 130 manages first super blocks p SUPER BLOCK<1, 4>, each of which includes a number of bad memory blocks that exceeds the preset number, among the first super blocks BAD+SUPERBLOCK0, by classifying them as fourth super blocks BAD+SUPERBLOCK2.

For example, the preset number may be '2' as shown in FIG. 7. In other words, the controller 130 manages the first super blocks SUPER BLOCK<0, 2, 3, N-2>, each of which includes 2 or less bad memory blocks, among the first super blocks BAD+SUPERBLOCK0, by classifying them as the third super blocks BAD+SUPERBLOCK1. Accordingly, in the third super blocks BAD+SUPERBLOCK1, there are included the zeroth super memory block SUPER BLOCK<0>, the second super memory block SUPER BLOCK<2>, the third super memory block SUPER BLOCK<3> and the (N-2)th super memory block SUPER BLOCK<N-2>.

Further, the controller 130 manages the first super blocks SUPER BLOCK<1, 4>, each of which includes more than 2 bad memory blocks, among the first super blocks BAD+SUPERBLOCK0, by classifying them as the fourth super blocks BAD+SUPERBLOCK2. Accordingly, included in the fourth super blocks BAD+SUPERBLOCK2, are the first super memory block SUPER BLOCK<1> and the fourth super memory block SUPER BLOCK<4>.

Although it is described that the preset number is '2', the preset number may be set to a different value depending on design and operational considerations. Moreover, in classifying the super blocks into different types, the classified types may be more than two. For example, the controller 130 may classify first super blocks into four super blocks based two preset numbers.

While not concretely illustrated in FIG. 7, there may occur a case where a certain super block which has been managed by being classified as a second super block NORMAL SUPERBLOCK in an initial operation of the memory system 110 is managed by being classified as the first super block BAD+SUPERBLOCK0 as erase-write cycles are repeatedly performed.

That is, there may occur a case where a good memory block of a certain super block which has been managed by being classified as a second super blocks NORMAL SUPERBLOCK in an initial operation of the memory system 110 may be determined as a bad memory block due to repetition of erase-write cycles. In this case, the controller 130 moves the valid data stored in the certain super block in which a bad memory block has occurred, to a target super block through a merge operation, and then, manages the certain super block which enters a free state, as a first super block BAD+SUPERBLOCK0. In this regard, depending on whether the number of the bad memory blocks in the certain super block which enter a free state exceeds the preset number or not, it is determined whether to manage the certain super block as a third super block BAD+SUPERBLOCK1 or a fourth super block BAD+SUPERBLOCK2.

In this regard, in order to prevent the reliability of the valid data having been stored in the certain super block, in which a bad block has become present, from degrading, the controller 130 may additionally perform an operation of detecting and correcting an error of the valid data having been stored in the certain super block, and may then move only the valid data determined as being normal, to a target super block through a merge operation.

Figure 8:
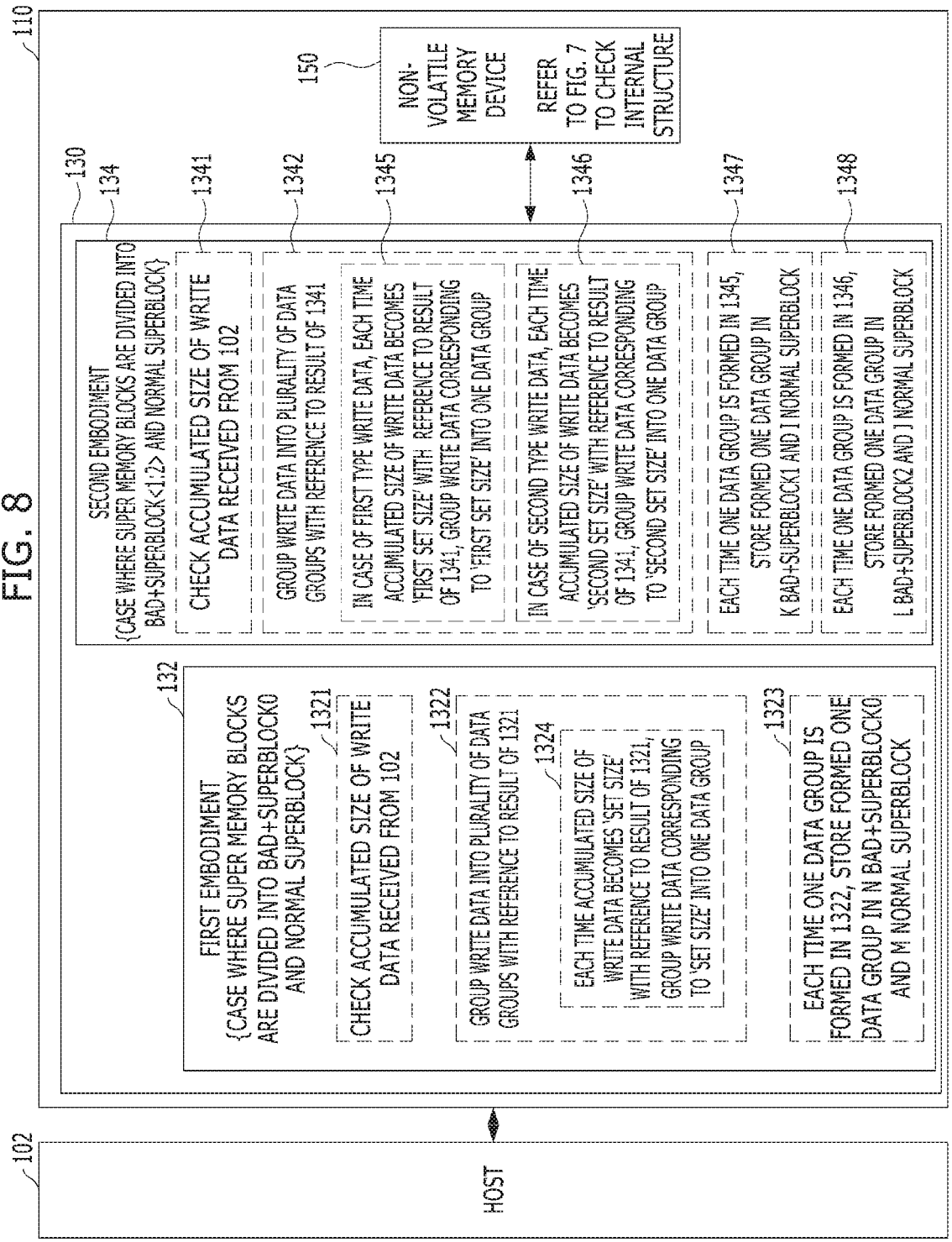

Referring to FIG. 8, there is illustrated a first embodiment 132 of the memory system 110 corresponding to the case where the super memory blocks SUPER BLOCK<0:N> described with reference to FIG. 7 are divided into first super blocks BAD+SUPERBLOCK0 and second super blocks NORMAL SUPERBLOCK.

In detail, the controller 130 may divide the super memory blocks SUPER BLOCK<0:N> of the memory system 110 into the first super blocks BAD+SUPERBLOCK0 and the second super blocks NORMAL SUPERBLOCK.

The first super blocks BAD+SUPERBLOCK0 are super blocks formed by mixing at least one bad memory block BAD BLOCK with normal memory blocks GOOD BLOCK and grouping them.

The second super blocks NORMAL SUPERBLOCK are super blocks formed by grouping only normal memory blocks GOOD BLOCK.

In operation 1321, the controller 130 checks an accumulated size of write data received from the host 102.

The controller 130 checks only the accumulated size of write data from the host 102 regardless of the type or characteristics of the write data. For example, the controller 130 checks the accumulated size of write data from the host 102 regardless of whether the write data is user data, system data, serial data, or random data.

In operation 1322, the controller 130 divides the write data from the host 102 into a plurality of data groups with reference to a result of operation 1321, i.e., a result of checking the accumulated size of write data from the host 102.

That is, in operation 1324 of the operation 1322, each time the accumulated size of write data from the host 102 becomes 'set size', with reference to the result of operation 1321, the controller 130 groups write data having a size corresponding to 'set size' into one data group.

For instance, the controller 130 may set 'set size' to 1 Gbyte. In this case, the controller 130 checks whether the accumulated size of write data from the host 102 corresponds to 1 Gbyte, and groups the checked write data corresponding to 1 Gbyte into one data group. Therefore, when write data having a total size of 10 Gbytes is received from the host 102, the controller 130 may check, by 1 Gbyte each time, 10 Gbytes of write data from the host 102, and group the write data into a total of ten data groups.

In operation 1323, each time one data group is formed in operation 1322, the controller 130 stores the one data group in N first super blocks BAD+SUPERBLOCK0 and M second super blocks NORMAL SUPERBLOCK. Here, N may be defined as a natural number of 1 or more, and M may be defined as a number greater than N.

That is, the controller 130 may be operated such that the number of second super blocks NORMAL SUPERBLOCK used to store write data grouped into one data group is greater than that of first super blocks BAD+SUPERBLOCK0.

Referring to FIGS. 7 and 8 together, the controller 130 may store write data grouped into one data group in one first super block BAD+SUPERBLOCK0 and in four second super blocks NORMAL SUPERBLOCK. For example, the one first super block BAD+SUPERBLOCK0 includes any one of a zeroth super block SUPER BLOCK<0>, a first super block SUPER BLOCK<1>, a second super block SUPER BLOCK<2>, a third super block SUPER BLOCK<3>, a fourth super block SUPER BLOCK<4>, and an N–2-th super block SUPER BLOCK<N–2>. The four second super blocks NORMAL SUPERBLOCK includes four super blocks selected from among fifth to N–3-th super blocks, an N–1-th super block SUPER BLOCK<N–1>, and an N-th super block SUPER BLOCK<N>. In this case, N may be 1, and M may be 4.

In more detail, each time one data group having 'set size' is formed in operation 1324, the controller 130 stores the one data group in N first super blocks BAD+SUPERBLOCK0 and M second super blocks NORMAL SUPERBLOCK.

In various embodiments, 'set size' may be predetermined based on the state of the memory device 150. For example, 'set size' may be predetermined based on a storage capacity and a transmission bandwidth of the memory device 150. In other words, 'set size' may be determined in various ways without restriction, depending on the type of memory device 150 included in the memory system 110 by a designer.

In various embodiments, the value of each of M and N may be predetermined based on the state of the memory device 150 and 'set size'. That is, the size of data capable of being stored in one first super block BAD+SUPERBLOCK0, the number of first super blocks BAD+SUPERBLOCK0, the size of data capable of being stored in one second super block NORMAL SUPERBLOCK, and the number of second super blocks NORMAL SUPERBLOCK may be predetermined during a process of managing a plurality of memory blocks in the controller 130 by grouping the plurality of memory blocks on a super memory block basis. Hence, the value of each of M and N may also be predetermined in correspondence with predetermining 'set size' based on the state of the memory device 150.

For example, when 'set size' is predetermined to be 1 Gbyte based on the state of the memory device 150, the size of data capable of being stored in one first super block BAD+SUPERBLOCK0 is 189 Mbytes, and the size of data capable of being stored in one second super block NORMAL SUPERBLOCK is 216 Mbytes. In this case, one data group having 1 Gbyte corresponding to 'set size' may be stored in four second super blocks NORMAL SUPERBLOCK and one first super block BAD+SUPERBLOCK0.

Figure 9:
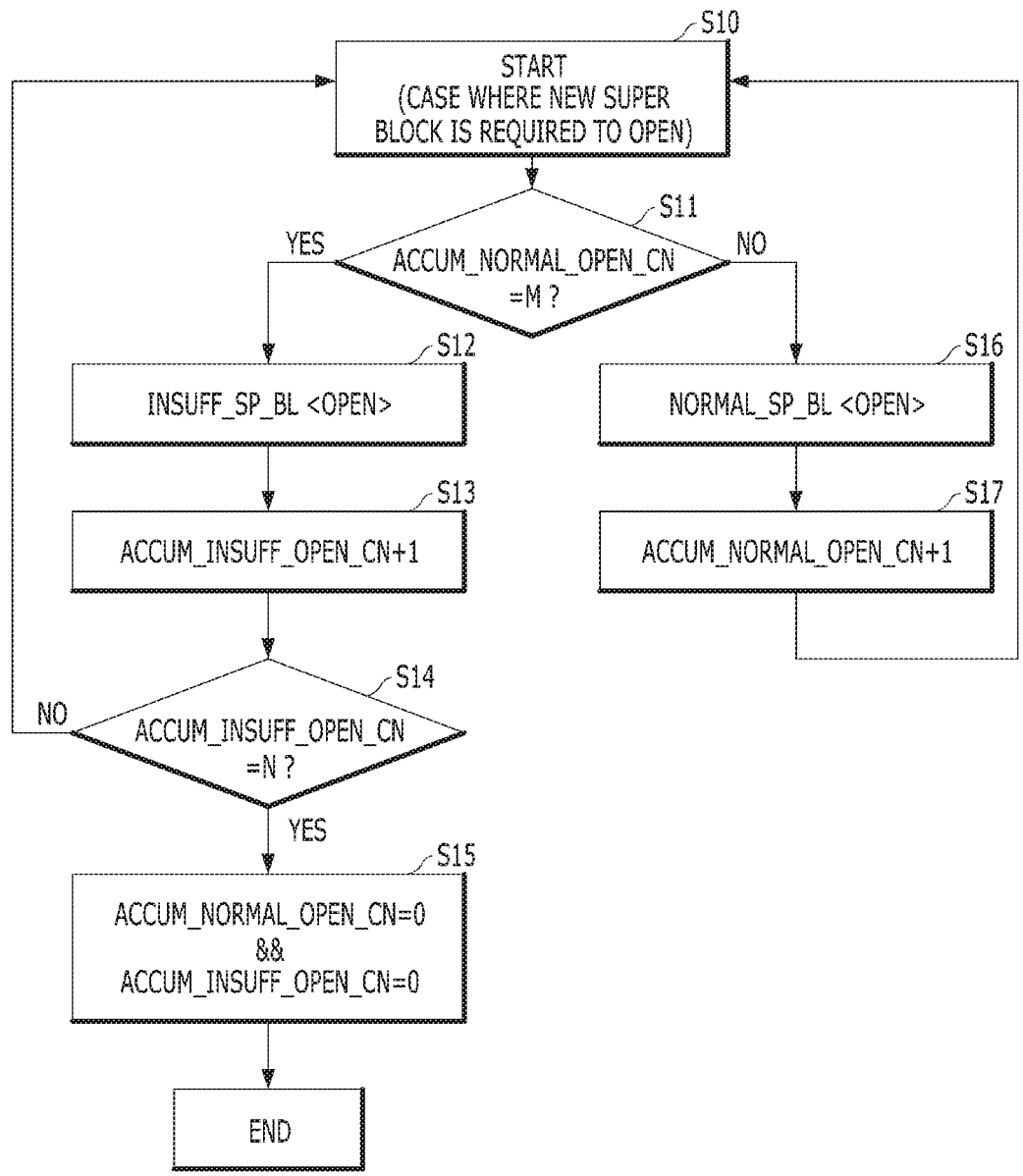

Referring to FIG. 9, a sequence may correspond to the first embodiment 132 of the memory system 110 described with reference to FIGS. 7 and 8. In other words, FIG. 9 illustrates the sequence, in which write data grouped into one data group are stored in first super blocks BAD+SUPERBLOCK0 and second super blocks NORMAL SUPERBLOCK through operation 1322 in the first embodiment 132 of FIGS. 7 and 8. Particularly, a scheme of making the number of second super blocks NORMAL SUPERBLOCK to be used greater than that of the first super blocks BAD+SUPERBLOCK0 may be illustrated in FIG. 9.

First, as described with reference to FIGS. 7 and 8, 'set size' corresponds to the size of write data included in one data group, and the value of each of M and N have been predetermined. For example, when 'set size' has been predetermined to be 1 Gbyte, M has been predetermined to be 4, and N has been predetermined to be 1. This example will be described in the following description.

In detail, the controller 130 manages a first use count ACCUM_INSUFF_OPEN_CN indicating the number of first super blocks BAD+SUPERBLOCK0 of which use has been completed in storing write data included in one data group among N (having value '1') first super blocks BAD+SUPERBLOCK0. That is, the controller 130 manages, through the first use count ACCUM_INSUFF_OPEN_CN, whether one first super block BAD+SUPERBLOCK0 has been used to store write data having 'set size' of 1 Gbyte included in the data group.

Furthermore, the controller 130 manages a second use count ACCUM_NORMAL_OPEN_CN indicating the number of second super blocks NORMAL SUPERBLOCK of which use has been completed in storing write data included in one data group among M (having value '4') second super blocks NORMAL SUPERBLOCK. That is, the controller 130 manages, through the second use count ACCUM_NORMAL_OPEN_CN, whether four second super blocks NORMAL SUPERBLOCK have been used to store write data having 'set size' of 1 Gbyte included in the data group.

In operation S10, when a new super block is required to open in response to reception of write data from the host 102, the controller 130 starts an operation. That is, in the case where there is no open super block at a time point at which write data is received from the host 102, the controller 130 should open a new super block. In this case, as shown in FIG. 9, the operation starts.

In operation S11, the controller 130 checks whether the second use count ACCUM_NORMAL_OPEN_CN has a value of 4 (or whether or not it is less than or equal to 4).

If it is checked that the second use count ACCUM_NORMAL_OPEN_CN does not have a value of 4 (or if it is less than or equal to 4) (S11, NO), in operation S16, the controller 130 selects any one of the second super blocks NORMAL SUPERBLOCK (or NORMAL_SP_BL) and opens those second super blocks. In other words, any one super block of the fifth to (N−3)-th super blocks, the (N−1)-th super block SUPER BLOCK<N−1>, and the N-th super block SUPER BLOCK<N> is selected and opens.

If any one second super block NORMAL SUPERBLOCK opens through operation S16, in operation S17, the controller 130 increases the value of the second use count ACCUM_ NORMAL_OPEN_CN by 1.

Furthermore, if the any one second super block NORMAL SUPERBLOCK opens through operation S16, the controller 130 stores write data received from the host 102, in the any one second super block NORMAL SUPERBLOCK that has opened in operation S16.

The any one second super block NORMAL SUPERBLOCK that has opened in operation S16 is closed if write data received from the host 102 have been stored in the entirety of internal storage space of the any one second super block NORMAL SUPERBLOCK. Thereafter, the operation S10 may be performed again. For example, when the size of the storage space of one second super block NORMAL SUPERBLOCK is 216 Mbytes, the any one second super block NORMAL SUPERBLOCK that has opened in operation S16 is closed after all write data having a size of 216 Mbytes received from the host 102 have been stored.

In summary, until the value of the second use count ACCUM_NORMAL_OPEN_CN, which increases from 0 by 1 each time, becomes 4, the controller 130 may repeatedly perform the above-mentioned operations S10, S11, S16, and S17, and open and close four second super blocks NORMAL SUPERBLOCK one by one.

As such, after the four second super blocks NORMAL SUPERBLOCK have been opened and closed one by one by repeatedly performing operations S10, S11, S16, and S17, if the controller 130 performs operation S11 again, it is checked that the second use count ACCUM_NORMAL_OPEN_CN has a value of 4 (S11, YES). Therefore, in operation S12, the controller 130 selects and opens any one of the first super blocks BAD+SUPERBLOCK0 (or INSUFF_SP_BL). In other words, the controller 130 selects and opens any one super block of the zeroth super block SUPER BLOCK<0>, the first super block SUPER BLOCK<1>, the second super block SUPER BLOCK<2>, the third super block SUPER BLOCK<3>, the fourth super block SUPER BLOCK<4>, and the (N−2)-th super block SUPER BLOCK<N−2>.

If any one first super block BAD+SUPERBLOCK0 opens through operation S12, in operation S13, the controller 130 increases the value of the first use count ACCUM_INSUFF_OPEN_CN by 1.

Furthermore, if the any one first super block BAD+SUPERBLOCK0 opens through operation S12, the controller 130 stores write data received from the host 102, in the any one first super block BAD+SUPERBLOCK0 that has opened in operation S12.

The any one first super block BAD+SUPERBLOCK0 that has opened in operation S12 is closed if write data received from the host 102 have been stored in the entirety of internal storage space of the any one first super block BAD+SUPERBLOCK0. Thereafter, the operation S10 may be performed again. For example, when the size of the storage space of one first super block BAD+SUPERBLOCK0 is 189 Mbytes, the any one first super block BAD+SUPERBLOCK0 that has opened in operation S12 is closed after all write data having a size of 189 Mbytes received from the host 102 have been stored.

In operation S14 after operation S13, the controller 130 checks whether the value of the first use count ACCUM_INSUFF_OPEN_CN has a value of 1 (or whether or not it is greater than or equal to 1), separately from the operation of storing write data in the any one first super block BAD+SUPERBLOCK0 that has opened in operation S13.

If it is checked that the first use count ACCUM_INSUFF_OPEN_CN has a value of 1 (or if it is greater than or equal to 1) (S14, YES), in operation S15, the controller 130 initializes the respective values of the first use count ACCUM_INSUFF_OPEN_CN and the second use count ACCUM_NORMAL_OPEN_CN to 0.

As such, the reason why the controller 130 initializes the respective values of the first use count ACCUM_INSUFF_OPEN_CN and the second use count ACCUM_NORMAL_OPEN_CN to 0 as a result of selecting 'YES' in operation S14 is because of the fact that four second super blocks NORMAL SUPERBLOCK are opened and closed while above-mentioned operations S10, S11, S16, and S17 are repeatedly performed until the value of the second use count ACCUM_NORMAL_OPEN_CN becomes 4 from 0, and one first super block BAD+SUPERBLOCK0 is opened and closed while operations S10, S11, S12, and S13 are repeatedly performed until the value of the first use count ACCUM_INSUFF_OPEN_CN becomes 1 from 0.

The reason for this is because the controller 130 has stored the write data of 1 Gbyte corresponding to one data group received from the host 102 in all of the four second super blocks NORMAL SUPERBLOCK and the one first super block BAD+SUPERBLOCK0 while increasing the second use count ACCUM_NORMAL_OPEN_CN and the first use count ACCUM_INSUFF_OPEN_CN until the second use count ACCUM_NORMAL_OPEN_CN becomes 4 and the first use count ACCUM_INSUFF_OPEN_CN becomes 1.

Therefore, after operation S15, if write data are received from the host 102 again, the controller 130 may re-perform the operation of opening a second super block NORMAL SUPERBLOCK and storing the write data in the second super block NORMAL SUPERBLOCK while performing above-described operations S10, S11, S16, and S17.

On the other hand, separately from performing operation S15 after operation S14, in other words, regardless of whether 'YES' is selected or 'NO' is selected in operation S14, any one first super block BAD+SUPERBLOCK0 which has opened in operation S14 may be closed if the write data received from the host 102 have been stored in the entirety of internal storage space of the any one first super block BAD+SUPERBLOCK0, and thereafter, operation S10 may be performed again. For example, when the size of the storage space of one first super block BAD+SUPERBLOCK0 is 189 Mbytes, the any one first super block BAD+SUPERBLOCK0 that has opened in operation S14 is closed after all write data having a size of 189 Mbytes received from the host 102 have been stored.

In summary, until the value of the first use count ACCUM_INSUFF_OPEN_CN becomes 1 from 0, the controller 130 may repeatedly perform the above-described operations S10, S11, S12, S13, and S14, and open and close one first super block BAD+SUPERBLOCK0.

For reference, in the foregoing first embodiment, because there has been illustrated the case where N is 1, operations S12, S13, and S14 have been described as being performed only once before operation S15 is performed. However, when N is 2 greater than 1, operations S12, S13, and S14 may be repeatedly performed two times before operation S15 is performed.

Referring again to FIG. 8, there is illustrated a second embodiment 134 of the memory system 110 corresponding to the case where the super memory blocks SUPER BLOCK<0:N> described with reference to FIG. 7 are divided into second super blocks NORMAL SUPERBLOCK, third super blocks BAD+SUPERBLOCK1, and fourth super blocks BAD+SUPERBLOCK2.

In detail, the controller 130 may divide the super memory blocks SUPER BLOCK<0:N> of the memory system 110 into the second super blocks NORMAL SUPERBLOCK, the third super blocks BAD+SUPERBLOCK1, and the fourth super blocks BAD+SUPERBLOCK2.

The second supper blocks NORMAL SUPERBLOCK are supper blocks formed by grouping only normal memory blocks GOOD BLOCK.

The third super blocks BAD+SUPERBLOCK1 are super blocks formed by mixing bad memory blocks BAD BLOCK, the number of which is a predetermined number or less, with normal memory blocks GOOD BLOCK and grouping them.

The fourth super blocks BAD+SUPERBLOCK2 are super blocks formed by mixing bad memory blocks BAD BLOCK, the number of which is a predetermined number or more, with normal memory blocks GOOD BLOCK and grouping them.

In operation 1341, the controller 130 checks an accumulated size of write data received from the host 102.

The controller 130 checks the type or characteristics of write data from the host 102, and then checks the accumulated size of the write data according to the type or characteristics thereof. For example, in the case where write data are user data or serial data, the controller 130 checks that the write data are a first type of write data, and checks an accumulated size of the first type of write data. Furthermore, in the case where write data are system data or random data, the controller 130 checks that the write data are a second type of write data, and checks an accumulated size of the second type of write data.

For reference, classifying the type or characteristics of write data into two types in the foregoing description is only for illustrative purposes, and actually the write data may be classified into a larger number of types without restriction. Furthermore, an operation of classifying the types of write data from the host 102 may be performed in the controller 130, or, alternatively, write data may be classified into types in the host 102 before being transmitted to the controller 130.

In operation 1342, the controller 130 divides the write data from the host 102 into a plurality of data groups with reference to a result of operation 1341, i.e., a result of checking the accumulated size of write data from the host 102.

In other words, in operation 1345 of the operation 1342, in the case where write data from the host 102 are the first type of data, each time the accumulated size of write data from the host 102 becomes 'first set size', with reference to the result of operation 1341, the controller 130 groups write data having a size corresponding to 'first set size' into one data group.

Furthermore, in operation 1346 of the operation 1342, in the case where write data from the host 102 are the second type of data, each time the accumulated size of write data from the host 102 becomes 'second set size', with reference to the result of operation 1341, the controller 130 groups write data having a size corresponding to 'second set size' into one data group.

For instance, the controller 130 may set 'first set size' to 1 Gbyte. In this case, the controller 130 checks whether the accumulated size of write data from the host 102 and classified as the first type corresponds to 1 Gbyte, and groups the checked 1 Gbyte of write data into one data group. Therefore, when write data having a total size of 10 Gbytes and classified as the first type is received from the host 102, the controller 130 may check, by 1 Gbyte each time, 10 Gbytes of write data from the host 102, and group the write data into a total of ten data groups.

Likewise, the controller 130 may set 'second set size' to 500 Mbytes. In this case, the controller 130 checks whether the accumulated size of write data from the host 102 and classified as the second type corresponds to 500 Mbytes, and groups the checked 500 Mbytes of write data into one data group. Therefore, when write data having a total size of 10 Gbytes and classified as the second type is received from the host 102, the controller 130 may check, by 500 Mbytes each time, 10 Gbytes of write data received from the host 102, and group the write data into total twenty data groups.

In operation 1347, each time one data group is formed in operation 1345, the controller 130 stores the one data group in K third super blocks BAD+SUPERBLOCK1 and I second super blocks NORMAL SUPERBLOCK.

In operation 1348, each time one data group is formed in operation 1346, the controller 130 stores the one data group in L fourth super blocks BAD+SUPERBLOCK2 and J second super blocks NORMAL SUPERBLOCK. Here, K may be defined as a natural number of 1 or more, K may be less than I, L may be less than J, L may be greater than K, and N may be defined as a number obtained by adding K to L.

In other words, the controller 130 may be operated such that the number of second super blocks NORMAL SUPERBLOCK used to store first type of write data grouped into one data group is greater than that of third super blocks BAD+SUPERBLOCK1.

In addition, the controller 130 may be operated such that the number of second super blocks NORMAL SUPERBLOCK used to store second type of write data grouped into one data group is greater than that of fourth super blocks BAD+SUPERBLOCK2.

Furthermore, taking into account the fact that the number of bad memory blocks BAD BLOCK included in each of the third super blocks BAD+SUPERBLOCK1 is less than the number of bad memory blocks BAD BLOCK included in each of the fourth super blocks BAD+SUPERBLOCK2, the controller 130 may be operated such that the number of third super blocks BAD+SUPERBLOCK1 to be used and the type of write data to be stored in the third super blocks BAD+SUPERBLOCK1 respectively differ from the number of fourth super blocks BAD+SUPERBLOCK2 to be used and the type of write data to be stored in the fourth super blocks BAD+SUPERBLOCK2.

Referring to FIGS. 7 and 8 together, the controller 130 may store first type of write data grouped into one data group in one third super block BAD+SUPERBLOCK1 and in four second super blocks NORMAL SUPERBLOCK. For example, the one third super block BAD+SUPERBLOCK1 includes any one of the zeroth super block SUPER BLOCK<0>, the second super block SUPER BLOCK<2>, the third super block SUPER BLOCK<3>, and the N−2-th super block SUPER BLOCK<N−2>. The four second super blocks NORMAL SUPERBLOCK includes four super blocks selected from among the fifth to N−3-th super blocks, the N−1-th super block SUPER BLOCK<N−1>, and the N-th super block SUPER BLOCK<N>. In this case, K may be 1, and I may be 4.

Furthermore, the controller 130 may store a second type of write data grouped into one data group in one fourth super block BAD+SUPERBLOCK2 and in two second super blocks NORMAL SUPERBLOCK. For example, the one fourth super block BAD+SUPERBLOCK2 includes any one of the first super block SUPER BLOCK<1> and the fourth super block SUPER BLOCK<4>. The two second super blocks NORMAL SUPERBLOCK includes two super blocks selected from among the fifth to (N−3)-th super blocks, the (N−1)-th super block SUPER BLOCK<N−1>, and the Nth super block SUPER BLOCK<N>. In this case, L may be 1, and J may be 2.

In more detail, each time one data group having 'first set size' is formed in operation 1345, the controller 130 stores the one data group in K third super blocks BAD+SUPERBLOCK1 and I second super blocks NORMAL SUPERBLOCK.

Each time one data group having 'second set size' is formed in operation 1346, the controller 130 stores the one data group in L fourth super blocks BAD+SUPERBLOCK2 and J second super blocks NORMAL.

In various embodiments, 'first set size' and 'second set size' may be predetermined based on the state of the memory device 150. For example, 'first set size' and 'second set size' may be predetermined based on a storage capacity and a transmission bandwidth of the memory device 150. In other words, 'first set size' and 'second set size' may be determined in various ways without restriction, depending on the type of memory device 150 included in the memory system 110 by a designer.

In various embodiments, the value of each of K, L, I, and J may be predetermined based on the state of the memory device 150, 'first set size', and 'second set size'. That is, the size of data capable of being stored in one third super block BAD+SUPERBLOCK1, the number of third super blocks BAD+SUPERBLOCK1, the size of data capable of being stored in one fourth super block BAD+SUPERBLOCK2, and the number of fourth super block BAD+SUPERBLOCK2, the size of data capable of being stored in one second super block NORMAL SUPERBLOCK, and the number of second super blocks NORMAL SUPERBLOCK may be predetermined during a process of managing a plurality of memory blocks in the controller 130 by grouping the plurality of memory blocks on a super memory block basis. Hence, the value of each of K, L, I, and J may also be predetermined in correspondence with predetermining 'first set size' and 'second set size' based on the state of the memory device 150.

For example, when 'first set size' is predetermined to be 1 Gbyte based on the state of the memory device 150, the size of data capable of being stored in one first super block BAD+SUPERBLOCK1 is 189 Mbytes, and the size of data capable of being stored in one second super block NORMAL SUPERBLOCK is 216 Mbytes. In this case, one data group having 1 Gbyte corresponding to 'first set size' may be stored in four second super blocks NORMAL SUPERBLOCK and one third super block BAD+SUPERBLOCK1.

Furthermore, when 'second set size' is predetermined to be 500 Mbytes based on the state of the memory device 150, the size of data capable of being stored in one fourth super block BAD+SUPERBLOCK2 is 162 Mbytes, and the size of data capable of being stored in one second super block NORMAL SUPERBLOCK is 216 Mbytes. In this case, one data group having 500 Mbytes corresponding to 'second set size' may be stored in two second super blocks NORMAL SUPERBLOCK and one fourth super block BAD+SUPERBLOCK2.

Figure 10:
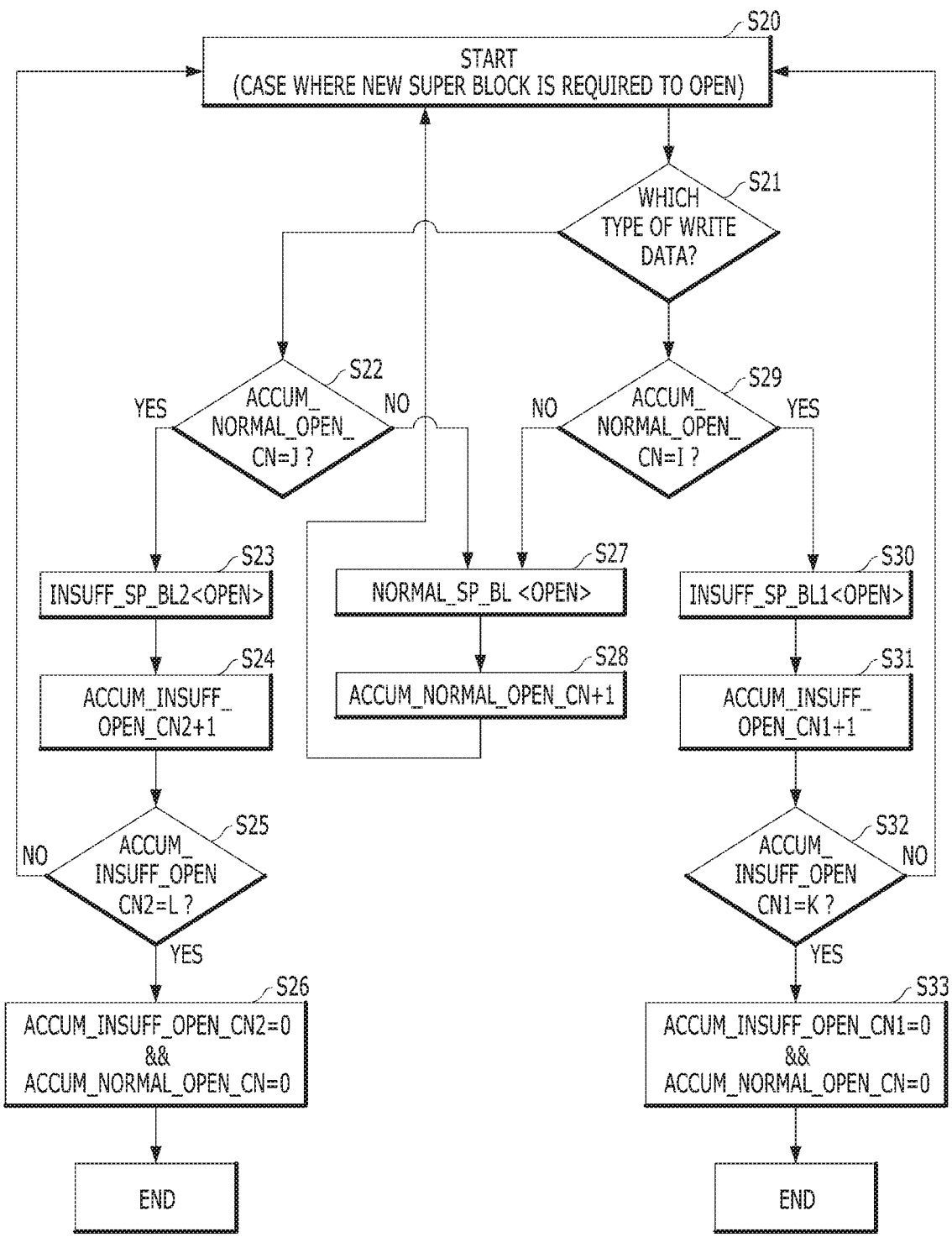

Referring to FIG. 10, a sequence may correspond to the second embodiment 134 of the memory system 110 described with reference to FIGS. 7 and 8. In other words, FIG. 10 illustrates the sequence, in which a first type of write data grouped into one data group is stored in third super blocks BAD+SUPERBLOCK1 and second super blocks NORMAL SUPERBLOCK through operation 1345 in the second embodiment 134 of FIGS. 7 and 8. Particularly, a scheme of making the number of second super blocks NORMAL SUPERBLOCK to be used greater than that of the third super blocks BAD+SUPERBLOCK1 may be illustrated in FIG. 10.

Furthermore, referring to FIG. 10, a sequence may correspond to the second embodiment 134 of the memory system 110 described with reference to FIGS. 7 and 8. In other words, FIG. 10 illustrates the sequence, in which a second type of write data grouped into one data group is stored in fourth super blocks BAD+SUPERBLOCK2 and second super blocks NORMAL SUPERBLOCK through operation 1346 in the second embodiment 134 of FIGS. 7 and 8. Particularly, a scheme of making the number of second super blocks NORMAL SUPERBLOCK to be used greater than that of the fourth super blocks BAD+SUPERBLOCK4 may be illustrated in FIG. 10.

First, as described with reference to FIGS. 7 and 8, a 'first set size', and a 'second set size' which corresponds to the size of write data are included in one data group, and the value of each of K, L, I, and J have been predetermined. For example, when 'first set size' is predetermined to be 1 Gbyte, 'second set size' is predetermined to be 500 Mbytes, I is predetermined to be 4, J is predetermined to be 2, K is predetermined to be 1, and L is predetermined to be 1. The above will be described in the following description.

In detail, the controller 130 manages a third use count ACCUM_INSUFF_OPEN_CN1 indicating the number of third super blocks BAD+SUPERBLOCK1 of which use has been completed in storing write data included in one data group among K (having value '1') third super blocks BAD+SUPERBLOCK1. That is, the controller 130 manages, through the third use count ACCUM_INSUFF_OPEN_CN1, whether one third super block BAD+SUPERBLOCK1 has been used to store write data having 'first set size' of 1 Gbyte included in the data group.

Furthermore, the controller 130 manages a fourth use count ACCUM_INSUFF_OPEN_CN2 indicating the number of fourth super blocks BAD+SUPERBLOCK2 of which use has been completed in storing write data included in one data group among L (having value '1') fourth super blocks BAD+SUPERBLOCK2. That is, the controller 130 manages, through the fourth use count ACCUM_INSUFF_OPEN_CN2, whether one fourth super block BAD+SUPERBLOCK2 has been used to store write data having 'second set size' of 500 Mbytes included in the data group.

Furthermore, the controller 130 manages a second use count ACCUM_NORMAL_OPEN_CN indicating the number of second super blocks NORMAL SUPERBLOCK of which use has been completed in storing write data included in one data group among I (having value '4') or J (having value '2') second super blocks NORMAL SUPERBLOCK. That is, the controller 130 manages, through the second use count ACCUM_NORMAL_OPEN_CN, whether four second super blocks NORMAL SUPERBLOCK have been used to store write data having 'first set size' of 1 Gbyte included in the data group. Furthermore, the controller 130 manages, through the second use count ACCUM_NORMAL_OPEN_CN, whether two second super blocks NORMAL SUPERBLOCK have been used to store write data having 'second set size' of 500 Mbytes included in the data group.

In operation S20, when a new super block is required to open in response to reception of write data from the host 102, the controller 130 starts an operation. That is, in the case where there is no open super block at a time point at which write data is received from the host 102, the controller 130 should open a new super block. In this case, as shown in FIG. 10, the operation starts.

In operation S21, the controller 130 checks the type of write data received from the host 102.

As a result of operation S21, when it is checked that a first type of write data is received from the host 102, in operation S29, the controller 130 checks whether the second use count ACCUM_NORMAL_OPEN_CN has a value of 4 (or whether or not it is less than or equal to 4).

If it is checked that the second use count ACCUM_NORMAL_OPEN_CN does not have a value of 4 (or if it is less than or equal to 4) (S29, NO), in operation S27, the controller 130 selects any one of the second super blocks NORMAL SUPERBLOCK (or NORMAL_SP_BL) and opens the super blocks. In other words, any one super block of the fifth to (N-3)-th super blocks, the (N-1)-th super block SUPER BLOCK<N-1>, and the Nth super block SUPER BLOCK<N> is selected and opened.

If any one second super block NORMAL SUPERBLOCK opens through operation S27, in operation S28, the controller 130 increases the value of the second use count ACCUM_ NORMAL_OPEN_CN by 1.

Furthermore, if the any one second super block NORMAL SUPERBLOCK opens through operation S27, the controller 130 stores write data received from the host 102, in the any one second super block NORMAL SUPERBLOCK that has opened in operation S27.

The any one second super block NORMAL SUPERBLOCK that has opened in operation S27 is closed when write data received from the host 102 is stored in the entirety of internal storage space of the any one second super block NORMAL SUPERBLOCK. Thereafter, the operation S20 may be performed again. For example, when the size of the storage space of one second super block NORMAL SUPERBLOCK is 216 Mbytes, the any one second super block NORMAL SUPERBLOCK that has opened in operation S27 is closed after all write data having a size of 216 Mbytes received from the host 102 have been stored.

In summary, until the value of the second use count ACCUM_NORMAL_OPEN_CN, which increases from 0 by 1 each time, becomes 4, the controller 130 may repeatedly perform above-described operations S20, S21, S29, S27, and S28, and open and close four second super blocks NORMAL SUPERBLOCK one by one.

As such, after the four second super blocks NORMAL SUPERBLOCK have been opened and closed one by one by repeatedly performing operations S20, S21, S29, S27, and S28, if the controller 130 performs operation S29 again, it is checked that the second use count ACCUM_NORMAL_OPEN_CN has a value of 4 (S29, YES). Therefore, in operation S30, the controller 130 selects and opens any one of the third super blocks BAD+SUPERBLOCK1 (or INSUFF_SP_BL1). In other words, the controller 130 selects and opens any one super block of the zeroth super block SUPER BLOCK<0>, the second super block SUPER BLOCK<2>, the third super block SUPER BLOCK<3>, and the (N-2)-th super block SUPER BLOCK<N-2>.

If any one third super block BAD+SUPERBLOCK1 opens through operation S30, in operation S31, the controller 130 increases the value of the third use count ACCUM_ INSUFF_OPEN_CN1 by 1.

Furthermore, if the any one third super block BAD+SUPERBLOCK1 opens through operation S30, the controller 130 stores write data received from the host 102, in the any one third super block BAD+SUPERBLOCK1 that has opened in operation S30.

The any one third super block BAD+SUPERBLOCK1 that has opened in operation S30 is closed if write data received from the host 102 have been stored in the entirety of internal storage space of the any one third super block BAD+SUPERBLOCK1 Thereafter, the operation S20 may be performed again. For example, when the size of the storage space of one third super block BAD+SUPERBLOCK1 is 189 Mbytes, the any one third super block BAD+SUPERBLOCK1 that has opened in operation S30 is closed after all write data having a size of 189 Mbytes received from the host 102 have been stored.

In operation S32, after operation S30, the controller 130 checks whether the value of the third use count ACCUM_INSUFF_OPEN_CN1 has a value of 1 (or whether or not it is greater than or equal to 1), separately from the operation of storing write data in the any one third super block BAD+SUPERBLOCK1 that has opened in operation S30.

If it is checked that the third use count ACCUM_INSUFF_OPEN_CN1 has a value of 1 (or if it is greater than or equal to 1) (S32, YES), in operation S33, the controller 130 initializes the respective values of the third use count ACCUM_INSUFF_OPEN_CN1 and the second use count ACCUM_NORMAL_OPEN_CN to 0.

As such, the reason why the controller 130 initializes the respective values of the third use count ACCUM_INSUFF_OPEN_CN1 and the second use count ACCUM_NORMAL_OPEN_CN to 0 as a result of selecting 'YES' in operation S32 is because of the fact that four second super blocks NORMAL SUPERBLOCK are opened and closed while the above-mentioned operations S20, S21, S29, S27, and S28 are repeatedly performed until the value of the second use count ACCUM_NORMAL_OPEN_CN becomes 4 from 0, and one third super block BAD+SUPERBLOCK1 is opened and closed while operations S20, S21, S29, S30 and S31 are repeatedly performed until the value of the third use count ACCUM_INSUFF_OPEN_CN1 becomes 1 from 0.

In other words, a reason for this is because the controller 130 has stored the write data of 1 Gbyte corresponding to one data group received from the host 102 in all of the four second super blocks NORMAL SUPERBLOCK and the one third super block BAD+SUPERBLOCK1 while increasing the second use count ACCUM_NORMAL_OPEN_CN and the third use count ACCUM_INSUFF_OPEN_CN1 until the second use count ACCUM_NORMAL_OPEN_CN becomes 4 and the third use count ACCUM_INSUFF_OPEN_CN1 becomes 1.

Therefore, after operation S33, if write data are received from the host 102 again, the controller 130 may re-perform the operation of opening a second super block NORMAL SUPERBLOCK and storing the write data in the second super block NORMAL SUPERBLOCK while performing above-described operations S20, S21, S29, S27, and S28.

On the other hand, separately from performing operation S33 after operation S32, in other words, regardless of whether 'YES' is selected or 'NO' is selected in operation S32, any one third super block BAD+SUPERBLOCK1 which has opened in operation S30 may be closed if the write data received from the host 102 have been stored in the entirety of internal storage space of the any one third super block BAD+SUPERBLOCK1, and thereafter, operation S20 may be performed again. For example, when the size of the storage space of one third super block BAD+SUPER-BLOCK1 is 189 Mbytes, the any one third super block BAD+SUPERBLOCK1 that has opened in operation S30 is closed after all write data having a size of 189 Mbytes received from the host 102 have been stored.

In summary, until the value of the third use count ACCUM_INSUFF_OPEN_CN1 becomes 1 from 0, the controller 130 may repeatedly perform operations S20, S21, S29, S30, and S31, and open and close one third super block BAD+SUPERBLOCK1.

For reference, in the foregoing second embodiment, because there has been illustrated the case where K is 1, operations S30, S31, and S32 have been described as being performed only once before operation S33 is performed. However, when K is 2 greater than 1, operations S30, S31, and S32 may be repeatedly performed two times before operation S33 is performed.

On the other hand, as a result of operation S21, when it is checked that a second type of write data are received from the host 102, in operation S22, the controller 130 checks whether the second use count ACCUM_NORMAL_OPEN_CN has a value of 2 (or whether it is less than or equal to 2).

If it is checked that the second use count ACCUM_NORMAL_OPEN_CN does not have a value of 2 (or if it is less than or equal to 2) (S22, NO), in operation S27, the controller 130 selects any one of the second super blocks NORMAL SUPERBLOCK and opens. In other words, any one super block of the fifth to (N−3)-th super blocks, the (N−1)-th super block SUPER BLOCK<N−1>, and the N-th super block SUPER BLOCK<N> is selected and opens.

If any one second super block NORMAL SUPERBLOCK opens through operation S27, in operation S28, the controller 130 increases the value of the second use count ACCUM_ NORMAL_OPEN_CN by 1.

Furthermore, if the any one second super block NORMAL SUPERBLOCK opens through operation S27, the controller 130 stores write data received from the host 102, in the any one second super block NORMAL SUPERBLOCK that has opened in operation S27.

The any one second super block NORMAL SUPERBLOCK that has opened in operation S27 is closed when write data received from the host 102 is stored in the entirety of internal storage space of the any one second super block NORMAL SUPERBLOCK. Thereafter, the operation S20 may be performed again. For example, when the size of the storage space of one second super block NORMAL SUPERBLOCK is 216 Mbytes, the any one second super block NORMAL SUPERBLOCK that has opened in operation S27 is closed after all write data having a size of 216 Mbytes received from the host 102 have been stored.

In summary, until the value of the second use count ACCUM_NORMAL_OPEN_CN, which increases from 0 by 1 each time, becomes 2, the controller 130 may repeatedly perform the above-described operations S20, S21, S22, S27, and S28, and open and close two second super blocks NORMAL SUPERBLOCK one by one.

As such, after the two second super blocks NORMAL SUPERBLOCK have been opened and closed one by one by repeatedly performing operations S20, S21, S22, S27, and S28, if the controller 130 performs operation S22 again, it is checked that the second use count ACCUM_NORMAL_OPEN_CN has a value of 2 (S22, YES). Therefore, in operation S23, the controller 130 selects and opens any one of the fourth super blocks BAD+SUPERBLOCK2 (or INSUFF_SP_BL2). In other words, the controller 130 selects and opens any one super block of the first super block SUPER BLOCK<1> and the fourth super block SUPER BLOCK<4>.

If any one fourth super block BAD+SUPERBLOCK2 opens through operation S23, in operation S24, the controller 130 increases the value of the fourth use count ACCUM_INSUFF_OPEN_CN2 by 1.

Furthermore, if the any one fourth super block BAD+SUPERBLOCK2 opens through operation S23, the controller 130 stores write data received from the host 102, in the any one fourth super block BAD+SUPERBLOCK2 that has opened in operation S23.

The any one fourth super block BAD+SUPERBLOCK2 that has opened in operation S23 is closed if write data received from the host 102 have been stored in the entirety of internal storage space of the any one fourth super block BAD+SUPERBLOCK2. Thereafter, the operation S20 may be performed again. For example, when the size of the storage space of one fourth super block BAD+SUPERBLOCK2 is 162 Mbytes, the any one fourth super block BAD+SUPERBLOCK2 that has opened in operation S23 is closed after all write data having a size of 162 Mbytes received from the host 102 have been stored.

In operation S25, after operation S23, the controller 130 checks whether the value of the fourth use count ACCUM_INSUFF_OPEN_CN2 has a value of 1 (or whether or not it is greater than or equal to 1), separately from the operation of storing write data in the any one third super block BAD+SUPERBLOCK1 that has opened in operation S23.

If it is checked that the fourth use count ACCUM_INSUFF_OPEN_CN2 has a value of 1 (or if it is greater than or equal to 1) (S25, YES), in operation S26, the controller 130 initializes the respective values of the fourth use count ACCUM_INSUFF_OPEN_CN2 and the second use count ACCUM_NORMAL_OPEN_CN to 0.

As such, the reason why the controller 130 initializes the respective values of the fourth use count ACCUM_INSUFF_OPEN_CN2 and the second use count ACCUM_NORMAL_OPEN_CN to 0 as a result of selecting 'YES' in operation S25 is because of the fact that two second super blocks NORMAL SUPERBLOCK are opened and closed while above-mentioned operations S20, S21, S22, S27, and S28 are repeatedly performed until the value of the second use count ACCUM_NORMAL_OPEN_CN becomes 2 from 0, and one fourth super block BAD+SUPERBLOCK2 is opened and closed while operations S20, S21, S22, S23, and S24 are repeatedly performed until the value of the third use count ACCUM_INSUFF_OPEN_CN1 becomes 1 from 0.

In other words, the reason for this is because the controller 130 has stored the write data of 1 Gbyte corresponding to one data group received from the host 102 in all of the two second super blocks NORMAL SUPERBLOCK and the one fourth super block BAD+SUPERBLOCK2 while increasing the second use count ACCUM_NORMAL_OPEN_CN and the fourth use count ACCUM_INSUFF_OPEN_CN2 until the second use count ACCUM_NORMAL_OPEN_CN becomes 2 and the fourth use count ACCUM_INSUFF_OPEN_CN2 becomes 1.

Therefore, after operation S26, if the write data are received from the host 102 again, the controller 130 may re-perform the operation of opening a second super block NORMAL SUPERBLOCK and storing the write data in the second super block NORMAL SUPERBLOCK while performing above-described operations S20, S21, S22, S27, and S28.

On the other hand, separately from performing operation S26 after operation S25, in other words, regardless of whether 'YES' is selected or 'NO' is selected in operation S25, any one fourth super block BAD+SUPERBLOCK2 which has opened in operation S23 may be closed if the write data received from the host 102 have been stored in the entirety of internal storage space of the any one fourth super block BAD+SUPERBLOCK2, and thereafter, operation S20 may be performed again. For example, when the size of the storage space of one fourth super block BAD+SUPER-BLOCK2 is 162 Mbytes, the any one fourth super block BAD+SUPERBLOCK2 that has opened in operation S23 is closed after all write data having a size of 162 Mbytes received from the host 102 have been stored.

In summary, until the value of the fourth use count ACCUM_INSUFF_OPEN_CN2 becomes 1 from 0, the controller 130 may repeatedly perform operations S20, S21, S22, S23, and S24, and open and close the one third super block BAD+SUPERBLOCK1.

For reference, in the foregoing second embodiment, because there has been illustrated the case where K is 1, operations S23, S24, and S25 have been described as being performed only once before operation S26 is performed. However, when K is 2 greater than 1, operations S23, S24, and S25 may be repeatedly performed two times before operation S26 is performed.

Hereinafter, a data processing system and electronic equipment provided with the memory system 110 including the memory device 150 and the controller 130 described with reference to FIGS. 1 to 8 in accordance with the present embodiment will be described in more detail with reference to FIGS. 11 to 19.

FIGS. 11 to 19 are diagrams illustrating application examples of the data processing system of FIG. 1.

Figure 11:
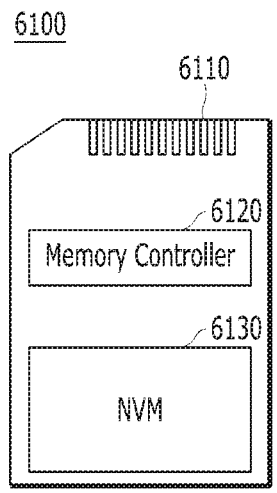
FIGS. 11 to 19 are diagrams illustrating application examples of a data processing system in accordance with various embodiments of the present invention.

FIG. 11 is a diagram illustrating another example of a data processing system including a memory system in accordance with the present embodiment. For example, FIG. 11 illustrates a memory card system 6100 to which the memory system in accordance with the present embodiment is applied.

Referring to FIG. 11, the memory card system 6100 may include a memory controller 6120, a memory device 6130 and a connector 6110.

More specifically, the memory controller 6120 may be connected to the memory device 6130 embodied by a nonvolatile memory (NVM), and configured to access the memory device 6130. For example, the memory controller 6120 may be configured to control read, write, erase and background operations of the memory device 6130. The memory controller 6120 may be configured to provide an interface between the memory device 6130 and a host, and drive firmware for controlling the memory device 6130. That is, the memory controller 6120 may correspond to the controller 130 of the memory system 110 described with reference to FIGS. 1 and 8, and the memory device 6130 may correspond to the memory device 150 of the memory system 110 described with reference to FIGS. 1 and 8.

Thus, the memory controller 6120 may include a random access memory (RAM), a processing unit, a host interface, a memory interface and an error correction unit. The memory controller 130 may further include the elements shown in FIG. 8.

The memory controller 6120 may communicate with an external device, for example, the host 102 of FIG. 1 through the connector 6110. For example, as described with reference to FIG. 1, the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), advanced technology attachment (ATA), serial-ATA, Parallel-ATA, small computer system interface (SCSI), enhanced small disk interface (EDSI), integrated drive electronics (IDE), Firewire, universal flash storage (UFS), wireless fidelity (Wi-Fi or WiFi) and Bluetooth. Thus, the memory system and the data processing system in accordance with the present embodiment may be applied to wired/wireless electronic devices or particularly mobile electronic devices.

The memory device 6130 may be implemented by a nonvolatile memory (NVM). For example, the memory device 6130 may be implemented by various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM). The memory device 6130 may include a plurality of dies as in the memory device 150 of FIG. 7.

The memory controller 6120 and the memory device 6130 may be integrated into a single semiconductor device. For example, the memory controller 6120 and the memory device 6130 may construct a solid state drive (SSD) by being integrated into a single semiconductor device. Also, the memory controller 6120 and the memory device 6130 may construct a memory card such as a PC card (personal computer memory card international association (PCM-CIA)), a compact flash (CF) card, a smart media card (e.g., SM and SMC), a memory stick, a multimedia card (e.g., MMC, RS-MMC, MMCmicro and eMMC), a secure digital (SD) card (e.g., SD, miniSD, microSD and SDHC) and a universal flash storage (UFS).

Figure 12:
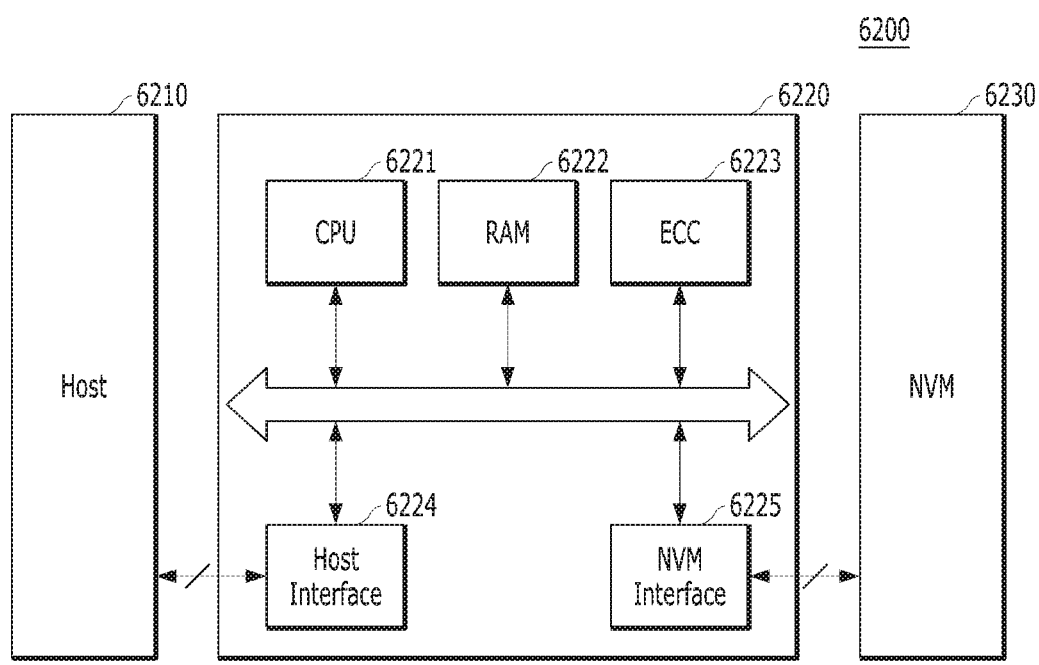

FIG. 12 is a diagram illustrating another example of a data processing system 6200 including a memory system in accordance with the present embodiment.

Referring to FIG. 12, the data processing system 6200 may include a memory device 6230 having one or more nonvolatile memories (NVMs) and a memory controller 6220 for controlling the memory device 6230. The data processing system 6200 illustrated in FIG. 12 may serve as a storage medium such as a memory card (e.g., CF, SD, micro-SD or the like) or USB device, as described with reference to FIG. 1. The memory device 6230 may correspond to the memory device 150 in the memory system 110 illustrated in FIGS. 1 to 8, and the memory controller 6220 may correspond to the controller 130 in the memory system 110 illustrated in FIGS. 1 to 8.

The memory controller 6220 may control a read, write or erase operation on the memory device 6230 in response to a request of the host 6210, and the memory controller 6220 may include one or more central processing units (CPUs) 6221, a buffer memory such as a random access memory (RAM) 6222, an error correction code (ECC) circuit 6223, a host interface 6224 and a memory interface such as an nonvolatile memory (NVM) interface 6225.

The CPU 6221 may control overall operations for the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the low-speed memory device 6230 to operate at high speed.

The ECC circuit 6223 may correspond to the ECC component 138 of the controller 130 illustrated in FIG. 1. As described with reference to FIG. 1, the ECC circuit 6223 may generate an error correction code (ECC) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. At this time, the ECC circuit 6223 may correct an error using the parity bit. For example, as described with reference to FIG. 1, the ECC circuit 6223 may correct an error using the low density parity check (LDPC) code, Bose-Chaudhri-Hocquenghem (BCH) code, turbo code, Reed-Solomon (RS) code, convolution code, recursive systematic code (RSC) or coded modulation such as trellis coded modulation (TCM) or block coded modulation (BCM).

The memory controller 6220 may transmit/receive data to/from the host 6210 through the host interface 6224, and transmit/receive data to/from the memory device 6230 through the NVM interface 6225. The host interface 6224 may be connected to the host 6210 through a parallel advanced technology attachment (PATA) bus, a serial advanced technology attachment (SATA) bus, a small computer system interface (SCSI), a universal serial bus (USB), a peripheral component interconnect-express (PCIe) or a NAND interface. The memory controller 6220 may have a wireless communication function with a mobile communication protocol such as wireless fidelity (WiFi) or long term evolution (LTE). The memory controller 6220 may be connected to an external device, for example, the host 6210 or another external device, and then transmit/receive data to/from the external device. In particular, as the memory controller 6220 is configured to communicate with the external device through one or more of various communication protocols, the memory system and the data processing system in accordance with the present embodiment may be applied to wired/wireless electronic devices or particularly a mobile electronic device.

Figure 13:
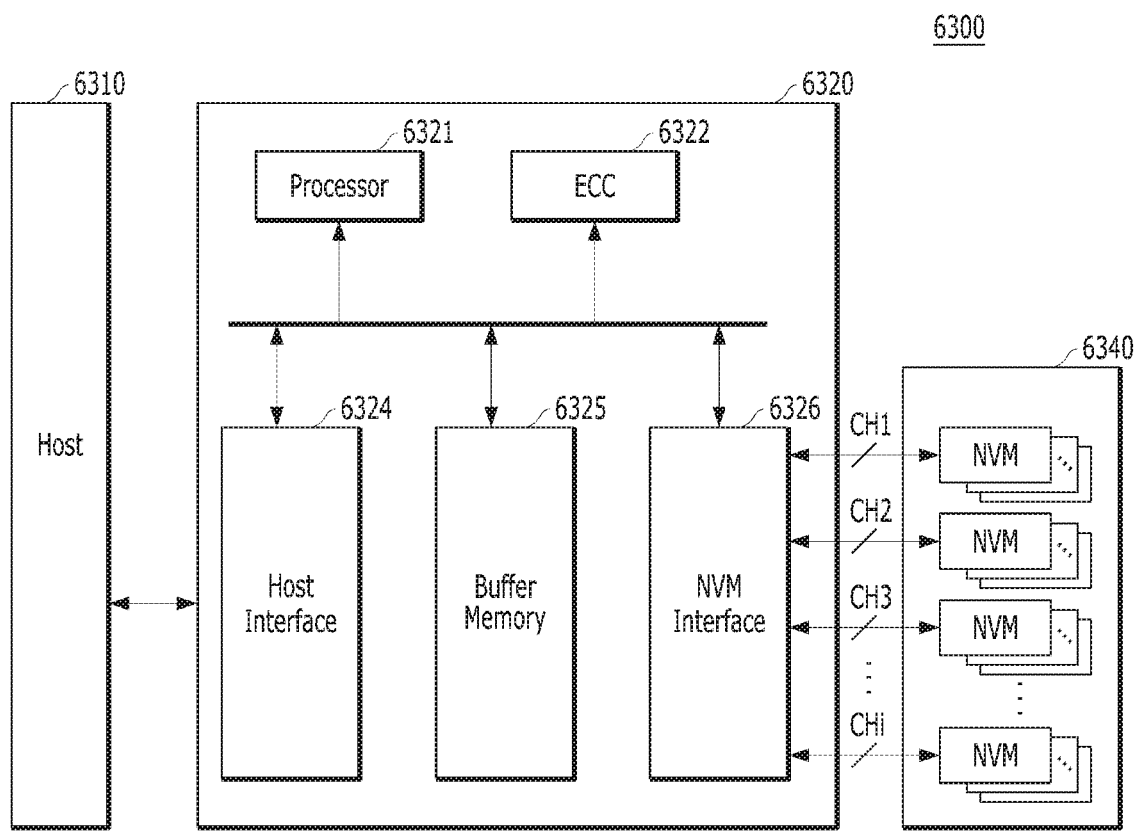

FIG. 13 is a diagram illustrating another example of a data processing system including a memory system in accordance with the present embodiment. For example, FIG. 13 illustrates a solid state drive (SSD) 6300 to which the memory system in accordance with the present embodiment is applied.

Referring to FIG. 13, the SSD 6300 may include a controller 6320 and a memory device 6340 including a plurality of nonvolatile memories (NVMs). The controller 6320 may correspond to the controller 130 in the memory system 110 of FIGS. 1 to 8, and the memory device 6340 may correspond to the memory device 150 in the memory system of FIGS. 1 to 8.

More specifically, the controller 6320 may be connected to the memory device 6340 through a plurality of channels CH1 to CHi. The controller 6320 may include one or more processors 6321, an error correction code (ECC) circuit 6322, a host interface 6324, a buffer memory 6325 and a memory interface, for example, a nonvolatile memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by volatile memories such as a dynamic random access memory (DRAM), a synchronous DRAM (SDRAM), a double data rate (DDR) SDRAM, a low power DDR (LPDDR) SDRAM and a graphics RAM (GRAM) or nonvolatile memories such as a ferroelectric RAM (FRAM), a resistive RAM (RRAM or ReRAM), a spin-transfer torque magnetic RAM (STT-MRAM) and a phase-change RAM (PRAM). For convenience, FIG. 13 illustrates that the buffer memory 6325 exists in the controller 6320. However, the buffer memory 6325 may exist outside the controller 6320.

The ECC circuit 6322 may calculate an error correction code (ECC) value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIGS. 1 to 8 is applied may be provided to embody a data processing system, for example, a redundant array of independent disks (RAID) system. At this time, the RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, and output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 14:
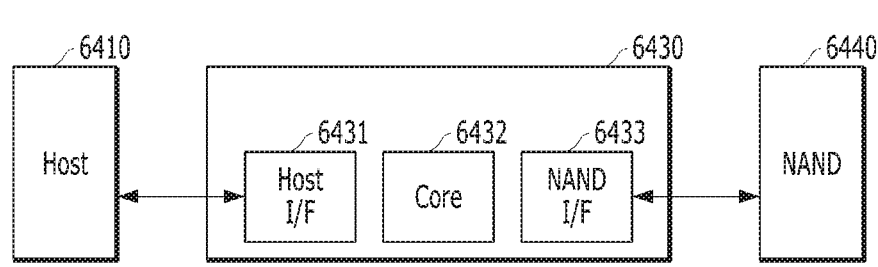

FIG. 14 is a diagram illustrating another example of a data processing system including a memory system in accordance with the present embodiment. For example, FIG. 14 illustrates an embedded multi-media card (eMMC) 6400 to which the memory system in accordance with the present embodiment is applied.

Referring to FIG. 14, the eMMC 6400 may include a controller 6430 and a memory device 6440 embodied by one or more NAND flash memories. The controller 6430 may correspond to the controller 130 in the memory system 110 of FIGS. 1 to 8, and the memory device 6440 may correspond to the memory device 150 in the memory system 110 of FIGS. 1 to 8.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control overall operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, ultra high speed (UHS)-I/UHS-II) interface.

FIGS. 15 to 18 are diagrams illustrating other examples of a data processing system including a memory system in accordance with the present embodiment. For example, FIGS. 15 to 18 illustrate universal flash storage (UFS) systems to which the memory system in accordance with the present embodiment is applied.

Referring to FIGS. 15 to 18, the UFS systems 6500, 6600, 6700 and 6800 may include hosts 6510, 6610, 6710 and 6810, UFS devices 6520, 6620, 6720 and 6820 and UFS cards 6530, 6630, 6730 and 6830, respectively. The hosts 6510, 6610, 6710 and 6810 may serve as application processors of wired/wireless electronic devices or particularly mobile electronic devices, the UFS devices 6520, 6620, 6720 and 6820 may serve as embedded UFS devices, and the UFS cards 6530, 6630, 6730 and 6830 may serve as external embedded UFS devices or removable UFS cards.

The hosts 6510, 6610, 6710 and 6810, the UFS devices 6520, 6620, 6720 and 6820 and the UFS cards 6530, 6630, 6730 and 6830 in the respective UFS systems 6500, 6600, 6700 and 6800 may communicate with external devices, for example, wired/wireless electronic devices or particularly mobile electronic devices through UFS protocols, and the UFS devices 6520, 6620, 6720 and 6820 and the UFS cards 6530, 6630, 6730 and 6830 may be embodied by the memory system 110 illustrated in FIGS. 1 to 8. For example, in the UFS systems 6500, 6600, 6700 and 6800, the UFS devices 6520, 6620, 6720 and 6820 may be embodied in the form of the data processing system 6200, the SSD 6300 or the eMMC 6400 described with reference to FIGS. 12 to 14, and the UFS cards 6530, 6630, 6730 and 6830 may be embodied in the form of the memory card system 6100 described with reference to FIG. 11.

Furthermore, in the UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may communicate with each other through an UFS interface, for example, MIPI M-PHY and MIPI unified protocol (UniPro) in mobile industry processor interface (MIPI). Furthermore, the UFS devices 6520, 6620, 6720 and 6820 and the UFS cards 6530, 6630, 6730 and 6830 may communicate with each other through various protocols other than the UFS protocol, for example, universal storage bus (USB) Flash Drives (UFDs), multi-media card (MMC), secure digital (SD), mini-SD, and micro-SD.

Figure 15:
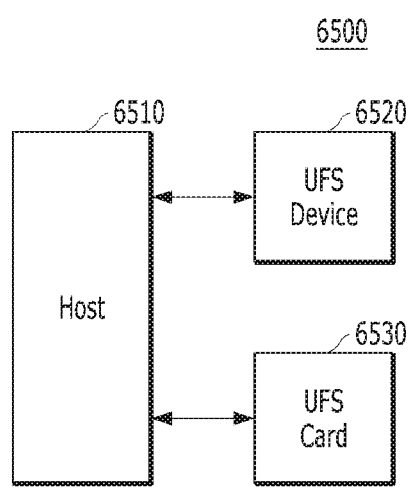

In the UFS system 6500 illustrated in FIG. 15, each of the host 6510, the UFS device 6520 and the UFS card 6530 may include UniPro. The host 6510 may perform a switching operation in order to communicate with the UFS device 6520 and the UFS card 6530. In particular, the host 6510 may communicate with the UFS device 6520 or the UFS card 6530 through link layer switching, for example, L3 switching at the UniPro. At this time, the UFS device 6520 and the UFS card 6530 may communicate with each other through link layer switching at the UniPro of the host 6510. In the present embodiment, the configuration in which one UFS device 6520 and one UFS card 6530 are connected to the host 6510 has been exemplified for convenience of description. However, a plurality of UFS devices and UFS cards may be connected in parallel or in the form of a star to the host 6410, and a plurality of UFS cards may be connected in parallel or in the form of a star to the UFS device 6520 or connected in series or in the form of a chain to the UFS device 6520.

Figure 16:
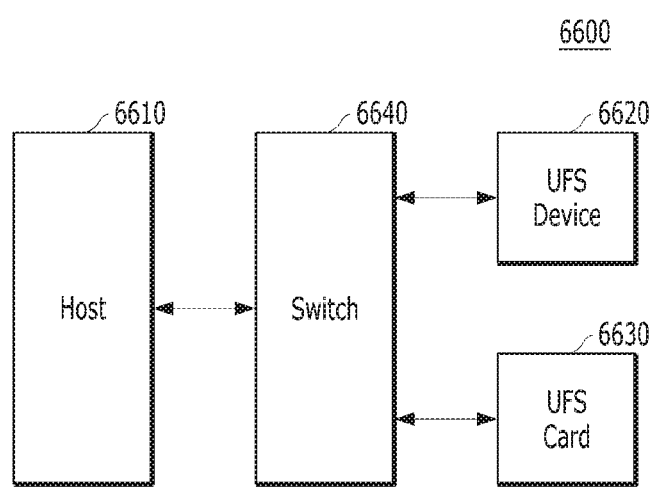

In the UFS system 6600 illustrated in FIG. 16, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In the present embodiment, the configuration in which one UFS device 6620 and one UFS card 6630 are connected to the switching module 6640 has been exemplified for convenience of description. However, a plurality of UFS devices and UFS cards may be connected in parallel or in the form of a star to the switching module 6640, and a plurality of UFS cards may be connected in series or in the form of a chain to the UFS device 6620.

Figure 17:
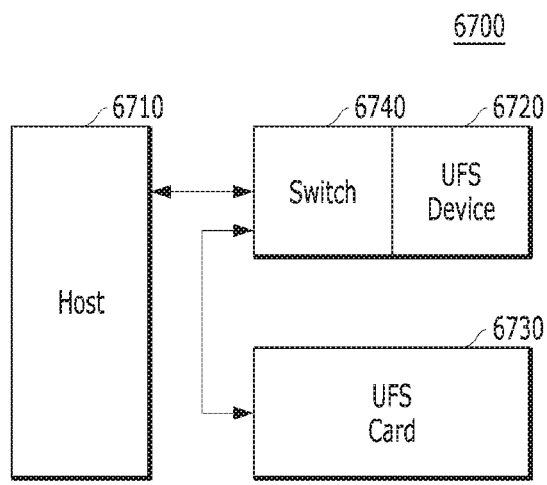

In the UFS system 6700 illustrated in FIG. 17, each of the host 6710, the UFS device 6720 and the UFS card 6730 may include UniPro, and the host 6710 may communicate with the UFS device 6720 or the UFS card 6730 through a switching module 6740 performing a switching operation, for example, through the switching module 6740 which performs link layer switching at the UniPro, for example, L3 switching. At this time, the UFS device 6720 and the UFS card 6730 may communicate with each other through link layer switching of the switching module 6740 at the UniPro, and the switching module 6740 may be integrated as one module with the UFS device 6720 inside or outside the UFS device 6720. In the present embodiment, the configuration in which one UFS device 6720 and one UFS card 6730 are connected to the switching module 6740 has been exemplified for convenience of description. However, a plurality of modules each including the switching module 6740 and the UFS device 6720 may be connected in parallel or in the form of a star to the host 6710 or connected in series or in the form of a chain to each other. Furthermore, a plurality of UFS cards may be connected in parallel or in the form of a star to the UFS device 6720.

Figure 18:
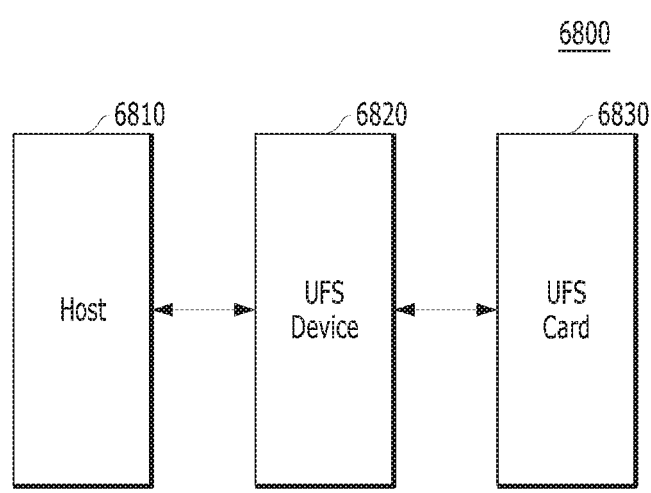

In the UFS system 6800 illustrated in FIG. 18, each of the host 6810, the UFS device 6820 and the UFS card 6830 may include M-PHY and UniPro. The UFS device 6820 may perform a switching operation in order to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target identifier (ID) switching operation. At this time, the host 6810 and the UFS card 6830 may communicate with each other through target ID switching between the M-PHY and UniPro modules of the UFS device 6820. In the present embodiment, the configuration in which one UFS device 6820 is connected to the host 6810 and one UFS card 6830 is connected to the UFS device 6820 has been exemplified for convenience of description. However, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 19:
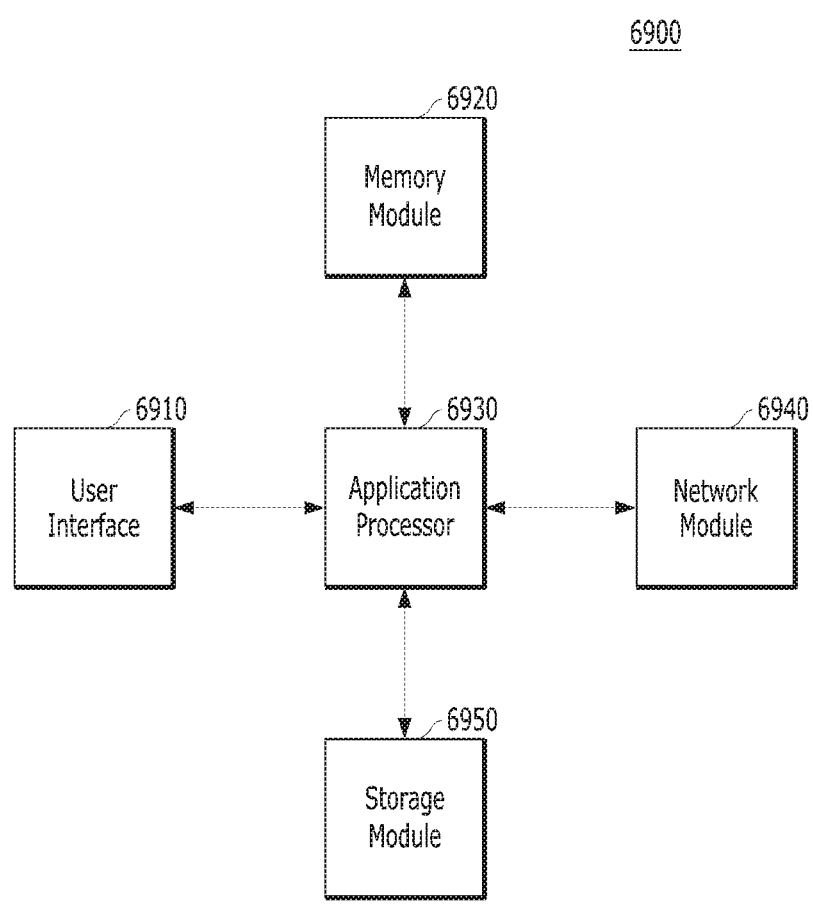

FIG. 19 is a diagram illustrating another example of a data processing system including a memory system in accordance with an embodiment. FIG. 19 is a diagram illustrating a user system 6900 to which the memory system in accordance with the present embodiment is applied.

Referring to FIG. 19, the user system 6900 may include a user interface 6910, a memory module 6920, an application processor 6930, a network module 6940, and a storage module 6950.

More specifically, the application processor 6930 may drive components included in the user system 6900, for example, an operating system (OS), and include controllers, interfaces and a graphic engine which control the components included in the user system 6900. The application processor 6930 may be provided as System-on-Chip (SoC).

The memory module 6920 may be used as a main memory, work memory, buffer memory or cache memory of the user system 6900. The memory module 6920 may include a volatile random access memory (RAM) such as a dynamic RAM (DRAM), a synchronous DRAM (SDRAM), a double data rate (DDR) SDRAM, DDR2 SDRAM, DDR3 SDRAM, a low power DDR (LPDDR) SDARM, LPDDR3 SDRAM or LPDDR3 SDRAM or a nonvolatile RAM such as a phase-change RAM (PRAM), a resistive RAM (ReRAM), a magneto-resistive RAM (MRAM) or a ferroelectric RAM (FRAM). For example, the application processor 6930 and the memory module 6920 may be packaged and mounted, based on package on package (PoP).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (WiMAX), wireless local area network (WLAN), ultra-wideband (UWB), Bluetooth, wireless display (WI-DI), thereby communicating with wired/wireless electronic devices or particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, NOR flash and 3D NAND flash, and provided as a removable storage medium such as a memory card or external drive of the user system 6900. The storage module 6950 may correspond to the memory system 110 described with reference to FIGS. 1 to 8. Furthermore, the storage module 6950 may be embodied as an SSD, eMMC and UFS as described above with reference to FIGS. 13 to 18.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIGS. 1 to 8 is applied to a mobile electronic device of the user system 6900, the application processor 6930 may control overall operations of the mobile electronic device, and the network module 6940 may serve as a communication module for controlling wired/wireless communication with an external device. The user interface 6910 may display data processed by the processor 6930 on a display/touch module of the mobile electronic device, or support a function of receiving data from the touch panel.

In various embodiments, when a plurality of memory blocks included in a memory device are grouped into and managed in super memory blocks, at least one bad memory block and normal memory blocks which are mixed with each other may be grouped and managed as a super memory block. Here, the frequency in use of the super memory block including the bad memory block may be appropriately adjusted.

Thereby, the super memory block including the bad memory block may be prevented from being excessively frequently used, whereby the overall performance of a memory system may be prevented from deteriorating.

What is claimed is:

1. A memory system comprising:
   a memory device including a plurality of memory blocks each including a plurality of pages, a plurality of planes each including the plurality of memory blocks, and a plurality of dies each including the plurality of planes; and
   a controller configured to manage the plurality of memory blocks as a plurality of super blocks formed by grouping the plurality of memory blocks in a form corresponding to set conditions,
   wherein the controller classifies and manages super blocks formed by mixing and grouping at least one bad memory block and normal memory blocks as first super blocks of the plurality of super blocks, and classifies and manages super blocks formed by grouping only normal memory blocks as second super blocks of the plurality of super blocks,
   wherein the controller checks an accumulated size of write data received from a host, groups the write data into a plurality of data groups based on a result of the checking of the accumulated size, and stores, each time one data group is formed, the formed one data group in N first super blocks and M second super blocks,
   wherein N is a natural number of 1 or more, and M is the natural number greater than N.

2. The memory system according to claim 1,
   wherein, each time the accumulated size of write data becomes a set size based on the result of the checking of the accumulated size, the controller groups the write data having a size corresponding to the set size into one data group and stores the one data group in the N first super blocks and the M second super blocks, and
   wherein the set size is predetermined based on a state of the memory device, and values of N and M are predetermined based on the predetermined set size.

3. The memory system according to claim 2, wherein the controller manages:

a first use count indicating the number of first super blocks used in storing the one data group among the N first super blocks; and a second use count indicating the number of second super blocks used in storing the one data group among the M second super blocks.

4. The memory system according to claim 3, wherein, when the second use count is different from M, the controller selects any one of the M second super blocks, increases a value of the second use count, and then stores the write data in the selected second super block.

5. The memory system according to claim 4,
wherein, when the second use count is equal to M, the controller selects any one of the N first super blocks, increases a value of the first use count, and then stores the write data in the selected first super block, and wherein, when the increased value of the first use count is equal to N, the controller initializes the respective values of the first and second use counts.

6. The memory system according to claim 1,
wherein the controller classifies and manages first super blocks each including bad blocks the number of which is a set value or less among the first super blocks as third super blocks, wherein the controller classifies and manages first super blocks each including bad blocks the number of which exceeds the set value among the first super blocks as fourth super blocks, wherein, when the write data are a first type of data, the controller stores the formed one data group in K third super blocks and I second super blocks, wherein, when the write data are a second type of data, the controller stores the formed one data group in L fourth super blocks and J second super blocks, and wherein K is a natural number of 1 or more, K is the natural number less than I, L is the natural number less than J, L is the natural number greater than K, and N is a number obtained by adding K to L.

7. The memory system according to claim 6,
wherein, when the write data are the first type of data, each time the accumulated size of write data becomes a first set size based on the result of the checking of the accumulated size, the controller groups the write data having a size corresponding to the first set size into one data group and stores the one data group in the K third super blocks and the I second super block, wherein, when the write data are the second type of data, each time the accumulated size of write data becomes a second set size based on the result of the checking of the accumulated size, the controller groups the write data having a size corresponding to the second set size into one data group and stores the one data group in the L fourth super blocks and the J second super block, and wherein the first and second set sizes are predetermined based on a state of the memory device, and values of N, K, L, M, I, and J are predetermined based on the predetermined set sizes.

8. The memory system according to claim 7, wherein the controller manages:
a second use count indicating the number of second super blocks used in storing the one data group among the I or J second super blocks;
a third use count indicating the number of third super blocks used in storing the one data group among the K third super blocks; and a fourth use count indicating the number of fourth super blocks used in storing the one data group among the L fourth super blocks.

9. The memory system according to claim 8,
wherein, when the write data are the first type of data and the second use count is different from I, the controller selects any one of the I second super blocks, increases a value of the second use count, and then stores the write data in the selected second super block, and wherein, when the write data are the second type of data and the second use count is different from J, the controller selects any one of the J second super blocks, increases the value of the second use count, and then stores the write data in the selected second super block.

10. The memory system according to claim 9,
wherein, when the write data are the first type of data and the second use count is equal to I, the controller selects any one of the K third super blocks, increases a value of the third use count, and then stores the write data in the selected third super block, and, when the increased value of the third use count is equal to K, the controller initializes the respective values of the second and third use counts, and wherein, when the write data are the second type of data and the second use count is equal to J, the controller selects any one of the L fourth super blocks, increases a value of the fourth use count, and then stores the write data in the selected fourth super block, and, when the increased value of the fourth use count is equal to L, the controller initializes the respective values of the second and fourth use counts.

11. A method of operating a memory system comprising a memory device, the memory device including a plurality of memory blocks each including a plurality of pages, a plurality of planes each including the plurality of memory blocks, and a plurality of dies each including the plurality of planes, the method comprising:
managing the plurality of memory blocks as a plurality of super blocks formed by grouping the plurality of memory blocks in a form corresponding to set conditions;

performing a first operation of classifying and managing, as first super blocks of the plurality of super blocks, super blocks formed by mixing and grouping at least one bad memory block and normal memory blocks;

performing a second operation of classifying and managing, as second super blocks of the plurality of super blocks, super blocks formed by grouping only normal memory blocks;

performing a third operation of checking an accumulated size of write data received from a host, and grouping the write data into a plurality of data groups based on a result of the checking of the accumulated size; and performing a storage operation for storing, each time one data group is formed in the third operation, the formed one data group in N first super blocks among the first super blocks formed in the first operation and M second super blocks among the second super blocks formed in the second operation, wherein N is a natural number of 1 or more, and M is the natural number greater than N.

12. The method according to claim 11, wherein the third operation comprises:
grouping, each time the accumulated size of write data becomes a set size based on the result of the checking of the accumulated size, the write data having a size corresponding to the set size into one data group, wherein the set size is predetermined based on a state of the memory device, and values of N and M are predetermined based on the predetermined set size.

13. The method according to claim 12, further comprising managing a first use count indicating the number of first super blocks used in storing the one data group among the N first super blocks, and a second use count indicating the number of second super blocks used in storing the one data group among the M second super blocks, the first and second use counts being used in the storage operation.

14. The method according to claim 13, wherein performing the storage operation comprises selecting, when the second use count is different from M, any one of the M second super blocks, increasing a value of the second use count, and then storing the write data in the selected second super block.

15. The method according to claim 14, wherein performing the storage operation comprises selecting, when the second use count is equal to M, any one of the N first super blocks, increasing a value of the first use count, and then storing the write data in the selected first super block, and initializing, when the increased value of the first use count is equal to N, the respective values of the first and second use counts.

16. The method according to claim 11, further comprising:
performing a fourth operation of classifying and managing, as third super blocks, first super blocks each including bad blocks the number of which is a set value or less among the first super blocks classified in the first operation; and
performing a fifth operation of classifying and managing, as fourth super blocks, first super blocks each including bad blocks the number of which exceeds the set value among the first super blocks classified in the first operation,
wherein performing the storage operation comprises:
performing a first storage operation of storing, when the write data are a first type of data, one data group formed in the third operation in K third super blocks among the third super blocks classified in the fourth operation and in I second super blocks among the second super blocks classified in the second operation; and
performing a second storage operation of storing, when the write data are a second type of data, one data group formed in the fourth operation in L fourth super blocks among the fourth super blocks classified in the fifth operation and in J second super blocks among the second super blocks classified in the second operation, and
wherein K is a natural number of 1 or more, K is the natural number less than I, L is the natural number less than J, L is the natural number greater than K, and N is a number obtained by adding K to L.

17. The method according to claim 16, wherein performing the third operation comprises:
grouping, when the write data are the first type of data and each time the accumulated size of write data becomes a first set size based on the result of the checking of the accumulated size, the write data having a size corresponding to the first set size into one data group; and
grouping, when the write data are the second type of data and each time the accumulated size of write data becomes a second set size based on the result of the checking of the accumulated size, the write data having a size corresponding to the second set size into one data group,
wherein the first and second set sizes are predetermined based on a state of the memory device, and values of N, K, L, M, I, and J are predetermined based on the predetermined set sizes.

18. The method according to claim 17, further comprising managing a second use count indicating the number of second super blocks used in storing the write data among the I or J second super blocks, a third use count indicating the number of third super blocks used in storing the write data among the K third super blocks, and a fourth use count indicating the number of fourth super blocks used in storing the write data among the L fourth super blocks.

19. The method according to claim 18,
wherein performing the first storage operation comprises selecting, when the second use count is different from I, any one of the I second super blocks, increasing a value of the second use count, and then storing the write data in the selected second super block, and
wherein performing the second storage operation comprises selecting, when the second use count is different from J, any one of the J second super blocks, increasing the value of the second use count, and then storing the write data in the selected second super block.

20. The method according to claim 19,
wherein performing the first storage operation comprises selecting, when the second use count is equal to M, any one of the K third super blocks, increasing a value of the third use count, and then storing the write data in the selected third super block, and, initializing, when the increased value of the third use count is equal to K, the respective values of the second and third use counts, and
wherein performing the second storage operation comprises selecting, when the second use count is equal to M, any one of the L fourth super blocks, increasing a value of the fourth use count, and then storing the write data in the selected fourth super block, and, initializing, when the increased value of the fourth use count is equal to L, the respective values of the second and fourth use counts.

* * * * *